United States Patent
Gritli et al.

(10) Patent No.: US 12,155,533 B2
(45) Date of Patent: Nov. 26, 2024

(54) PROPAGATING PLACEMENT AND ISOLATION CONSTRAINTS TO NETWORK SLICE CONSTITUENTS

(71) Applicant: TELEFONAKTIEBOLAGET LM ERICSSON (PUBL), Stockholm (SE)

(72) Inventors: Nour Gritli, Montreal (CA); Maria Toeroe, Montreal (CA); Ferhat Khendek, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/271,347

(22) PCT Filed: Dec. 27, 2021

(86) PCT No.: PCT/IB2021/062354
§ 371 (c)(1),
(2) Date: Jul. 7, 2023

(87) PCT Pub. No.: WO2022/153121
PCT Pub. Date: Jul. 21, 2022

(65) Prior Publication Data
US 2024/0305532 A1 Sep. 12, 2024

Related U.S. Application Data

(60) Provisional application No. 63/136,918, filed on Jan. 13, 2021.

(51) Int. Cl.
*G06F 15/177* (2006.01)
*H04L 41/0806* (2022.01)
(Continued)

(52) U.S. Cl.
CPC ...... *H04L 41/0895* (2022.05); *H04L 41/0806* (2013.01); *H04L 41/0894* (2022.05)

(58) Field of Classification Search
CPC ............. H04L 41/0895; H04L 41/0894; H04L 41/0806
See application file for complete search history.

(56) References Cited

U.S. PATENT DOCUMENTS

2014/0101634 A1    4/2014   Abbasipour

FOREIGN PATENT DOCUMENTS

WO    2018229559 W    12/2018

OTHER PUBLICATIONS

3GPP TR 28.801 V15.1.0, "3rd Generation Partnership Project; Technical Specification Group Services and System Aspects; Telecommunication management; Study on management and orchestration of network slicing for next generation network (Release 15)," Jan. 2018. [Online]. Available: https://portal.3gpp.org/desktopmodules/Specifications/SpecificationDetails.aspx?specificationId=3091.
(Continued)

*Primary Examiner* — Joseph R Maniwang
(74) *Attorney, Agent, or Firm* — Ericsson Canada Inc.

(57) ABSTRACT

The disclosure relates to a method, system, apparatus and non-transitory computer readable media for propagating placement constraints and isolation requirements, from user intents and operator policies to constituents of user requested network slices (NwSs) and communication services (CSs). The method comprises decomposing the user intents and the operator policies into functionalities corresponding to the constituents of the requested NwSs and CSs, and storing the functionalities in a solution map (SM) model. The method comprises propagating the placement constraints to the functionalities in the SM model. The method comprises propagating the isolation requirements to the functionalities in the SM model. The method comprises deploying constituent virtual network functions (VNFs) and physical network functions (PNFs) of the NwSs and CSs,
(Continued)

according to the corresponding functionalities of the SM model.

25 Claims, 17 Drawing Sheets

(51) Int. Cl.
*H04L 41/0894* (2022.01)
*H04L 41/0895* (2022.01)

(56) References Cited

OTHER PUBLICATIONS

3GPP TR 28.812 V0.10.0, "Technical Specification Group Services and System Aspects; Telecommunication management; Study on scenarios for Intent driven management services for mobile networks (Release 16)," Mar. 2020. [Online]. Available: https://portal.3gpp.org/desktopmodules/Specifications/SpecificationDetails.aspx?specificationId=3553.

3GPP TS 22.261 V17.3.0, "Technical Specification Group Services and System Aspects; Service requirements for the 5G system; Stage 1 (Release 17)," Jul. 2020 [Online]. Available: https://portal.3gpp.org/desktopmodules/Specifications/SpecificationDetails.aspx?specificationId=3107.

3GPP, 3rd Generation Partnership Project; Technical Specification Group Services and System Aspects; Management and orchestration; Concepts, use cases and requirements TS 28.530 V16.2.0 (Jul. 2020).

Da Silva Coelho Wesley et al: "On the impact of novel function mappings, sharing policies, and split settings in network slice design", 2020 16th International Conference on Network and Service Management (CNSM), IFIP, Nov. 2, 2020.

Etsi GR ZSM 005 V1.1.1, "Zero-touch network and Service Management (ZSM); Means of Automation," May 2020. [Online]. Available: https://www.etsi.org/deliver/etsi_gr/ZSM/001_099/005/01.01.01_60/gr_ZSM005v010101p.pdf.

Gritli Nour et al: "Decomposition and Propagation of Intents for Network Slice Design", 2021 IEEE 4th 5G World Forum (5GWF), IEEE, Oct. 13, 2021.

Gritli Nour et al: "Network Slice Provisioning Taking Into Account Tenant Intents and Operator Policies", 2021 IEEE Conference on Network Function Virtualization and Software Defined Networks (NFV-SDN), IEEE, Nov. 9, 2021.

Navid Nazarzadeoghaz; Ferhat Khendek; Maria Toeroe; Ericsson Inc, ECE, Concordia University; "Automated Design of Network Services from Network Service Requirements"; 23rd Conference on Innovations in Clouds, Internet and Networks (ICIN 2020).

Ramenzoni, Stefano, International Search Report, PCT/IB2021/062354, Epo, Mar. 17, 2022, The Netherlands.

PROPAGATING PLACEMENT AND ISOLATION CONSTRAINTS TO NETWORK SLICE CONSTITUENTS

CROSS-REFERENCE TO RELATED APPLICATIONS

This application is a 35 U.S.C. § 371 national phase filing of International Application No. PCT/IB2021/062354, filed Dec. 27, 2021, which claims the benefit of U.S. Provisional Application No. 63/136,918, filed Jan. 13, 2021, the disclosures of which are incorporated herein by reference in their entireties.

TECHNICAL FIELD

The present disclosure relates to the field of cloud systems management and network slice design and deployment.

BACKGROUND

Network slicing enables the provisioning of multiple logical networks, i.e. network slices (NwSs), on top of a common physical infrastructure. These NwSs are customized to meet specific functional requirements (e.g. security functions, handover management and mobility management functions) as well as non-functional requirements such as performance, QoS and isolation. The provisioning of a NwS may be triggered upon the request of one or multiple communication services (CSs) or a transport slice also known as "NwS as a Service" (NSaaS). The provisioned NwSs should support the requested CSs in the first scenario and meet their QoS requirements. In the second scenario, the NwS should be created with the appropriate functionalities for the requested performance characteristics.

The main motivation behind network slicing is the capability of supporting CSs with different performance requirements simultaneously in the same physical infrastructure. For example, in Third Generation Partnership Project (3GPP) standards, three main service categories or slice types were defined based on their performance requirements, i.e. enhanced Mobile Broad Band (eMBB), Ultra-Reliable and Low-Latency Communications (URLLC), massive Machine Type Communications (mMTC). The eMBB services are characterized with high data rates and traffic capacities. The URLLC services require very low latency and high reliability. The mMTC services need to support a high density of IoT devices, while maintaining cost efficiency. In 3GPP, target performance requirements were given for some use cases. For instance, a high data rate service with a user density of 100/km2 in a rural macro scenario requires 50 Mbps of data rate downlink (DL).

The management of a NwS is performed by three functional blocks. The Communication Service Management Function (CSMF) is in charge of translating a CS into NwS requirements as well as interacting with the Network Slice Management Function (NSMF). The main role of the NSMF is the lifecycle management of the NwS, and accordingly, determining the network slice subnets related requirements and passing them to the Network Slice Subnet Management Function (NSSMF). The latter is responsible for the lifecycle management of NwS subnets.

3GPP defines four phases for the lifecycle management of a NwS instance. Before an NwS can be instantiated it needs to be designed as part of the preparation phase. This includes the evaluation of the NwS requirements, the creation and the on-boarding of the network slice template (NST). The NST includes a complete description of the structure, configuration and workflows for the NwS instantiation and its life cycle management. The commissioning phase involves the instantiation and the configuration of the NwS resources. The third lifecycle management phase is the operation of the NwS instance, in which the NwS instance can be activated, deactivated, or modified. The final phase is the decommissioning of the NwS instance, when it is deactivated and its resources are deallocated (reclaimed).

The introduction of multiple NwSs with different performance and functional requirements to telecommunication networks, in combination with the possibility of spanning multiple operators' domains, raises the complexity of network management which needs to ensure the required performance. Therefore, efforts are put in place to automate and reduce the complexity of management of these networks. In this context, concepts like zero touch networks and intent-based networking are being developed to achieve this automation. For instance, 3GPP introduces the concept of intent driven Management Service (MnS) for mobile networks. The goal of this intent driven MnS is to reduce the complexity of management, by allowing to express intents for managing the network and its services without knowing the details of the underlying infrastructure. The intent driven MnS is then responsible for translating the intents into executable actions. Multiple scenarios are provided in this context, such as CS deployment at the edge, network provisioning, etc. In the network provisioning scenario, for example, a consumer should be capable of expressing their intent by providing high level requirements, for example, that they would like an eMBB NwS which provides 50 Mbps in the DL data rate for a maximum number of UEs. The intent driven MnS needs to translate this intent into deployment related requirements, such as resources, placement and configuration.

The authors have previously proposed to combine user and operator intents in a consistent way to determine the number and type of NwSs needed to satisfy the intents so that this information can be used as input for the deployment of those NwSs.

SUMMARY

Current efforts in the area of intent-based management and networks automation focus on run-time phases of the NwS lifecycle management (commissioning, operation and decommissioning). The intent-based design of NwSs of the preparation phase is not addressed yet. Instead pre-defined NSTs are being used. Since consumer requirements and needs can vary widely from both functional and non-functional perspective, they may not always have a direct translation to a pre-defined or to existing NSTs.

In addition, the design of a NwS is a complex task, during which different requirements need to be analyzed and translated into deployment templates/descriptors. Besides QoS requirements, user/customer intents can include placement constraints and/or isolation requirements for different reasons (administrative, performance, reliability, etc.). Operators may have placement constraints and/or isolation requirements of their own. Standards also may specify placement constraints and/or isolation requirements, to which adhering is key for interoperability in multi-vendor environments. Finally, the implementation solutions may have restrictions on the placement and also related to isolation (e.g. solutions may differ depending on where they are deployed).

The NwS design solution may be different/dependent on these constraints and requirement, but are usually only considered at the deployment phase.

The NwS design process, may handle the placement constraints and isolation requirements coming from different sources (the user, the operator, standards and available implementations), and propagate these placement constraints and isolation requirements to the different constituents of NwSs. In such a process, the potential contradictions are resolved, and the appropriate resulting constraints are propagated to the low-level functionalities of the NwSs, so that these placement constraints and isolation requirements can be fulfilled by the appropriate virtual network functions (VNFs) and physical network functions (PNFs) and their placement.

There is provided a method for propagating placement constraints and isolation requirements, from user intents and operator policies to constituents of user requested network slices (NwSs) and communication services (CSs). The method comprises decomposing the user intents and the operator policies into functionalities corresponding to the constituents of the requested NwSs and CSs, and storing the functionalities in a solution map (SM) model. The method comprises propagating the placement constraints to the functionalities in the SM model. The method comprises propagating the isolation requirements to the functionalities in the SM model. The method comprises deploying constituent virtual network functions (VNFs) and physical network functions (PNFs) of the NwSs and CSs, according to the corresponding functionalities of the SM model.

There is provided an apparatus or system, for propagating placement constraints and isolation requirements, from user intents and operator policies to constituents of user requested network slices (NwSs) and communication services (CSs). The apparatus or system comprises processing circuits and a memory, the memory containing instructions executable by the processing circuits whereby the apparatus or system is operative to execute the following steps. Decompose the user intents and the operator policies into functionalities corresponding to the constituents of the requested NwSs and CSs, and store the functionalities in a solution map (SM) model. Propagate the placement constraints to the functionalities in the SM model. Propagate the isolation requirements to the functionalities in the SM model. Deploy constituent virtual network functions (VNFs) and physical network functions (PNFs) of the NwSs and CSs, according to the corresponding functionalities of the SM model.

There is provided a non-transitory computer readable media having stored thereon instructions for propagating placement constraints and isolation requirements, from user intents and operator policies to constituents of user requested network slices (NwSs) and communication services (CSs). The instructions comprise decomposing the user intents and the operator policies into functionalities corresponding to the constituents of the requested NwSs and CSs, and storing the functionalities in a solution map (SM) model. The instructions comprise propagating the placement constraints to the functionalities in the SM model. The instructions comprise propagating the isolation requirements to the functionalities in the SM model. The instructions comprise deploying constituent virtual network functions (VNFs) and physical network functions (PNFs) of the NwSs and CSs, according to the corresponding functionalities of the SM model.

The method, apparatus, system and non-transitory readable media provided herein present improvements to the way previous method, apparatus, system and non-transitory readable media for propagating placement constraints and isolation requirements for network slices (NwSs) and communication services (CSs) operate.

The proposed solution resolves, in the NwS design phase, the potential conflicts among placement constraints and isolation requirements originating from different sources, therefore allowing the selection of appropriate VNFs/PNFs as well as determining their relations and placements for the deployment (e.g. dependencies, anti-affinity relations, locations).

In particular, the SM model resulting from the method describes all the constituents necessary to deploy the requested NwSs and CSs with the matched placement constraints and the isolation requirements applicable to each to the constituents implemented as VNFs or PNFs and can be used to deploy the NwSs and CSs as intended by the user, and in compliance with the operator's policies as well as with applicable standards.

DETAILED DESCRIPTION

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed.

In the context of intent based NwS design, a user can express their intent at a high-level without knowing the details of how it is achieved in an operator's network. As part of this intent the user may constrain the placement of some functionalities to certain location(s) and/or express partial or full isolation constraints for the different parts of the requested NwSs/CSs. Operators, on the other hand, also may have policies related to the placement and/or the isolation of certain functionalities within NwSs reflecting their intent. Different standards may impose such constraints and requirements as well. Finally, existing or known solutions may have been created for, deployed and operated under different placement constraints and/or isolation requirements as well, and such information can be collected in a knowledgebase to be used for example in the NwS design process.

The proposed approach considers and applies all these placement constraints and isolation requirements through the decomposition process of the combined user and operator intents into lower-level functionalities, which as a result allows the selection and deployment of the necessary VNFs and PNFs in appropriate relations and locations.

The approach expects two main inputs, namely the CombinedIntents representing the combination of the user and operator high-level intents for a set of NwSs and CSs, and the NSliceOntology containing a knowledgebase about existing, standard or otherwise known solutions of NwS and CS decompositions. The CombinedIntents includes the placement and isolation constraints of the user and the operator, while the NSliceOntology contains the placement and isolation constraints/limitation used/applied in the known decompositions and existing implementations.

Figure 1:
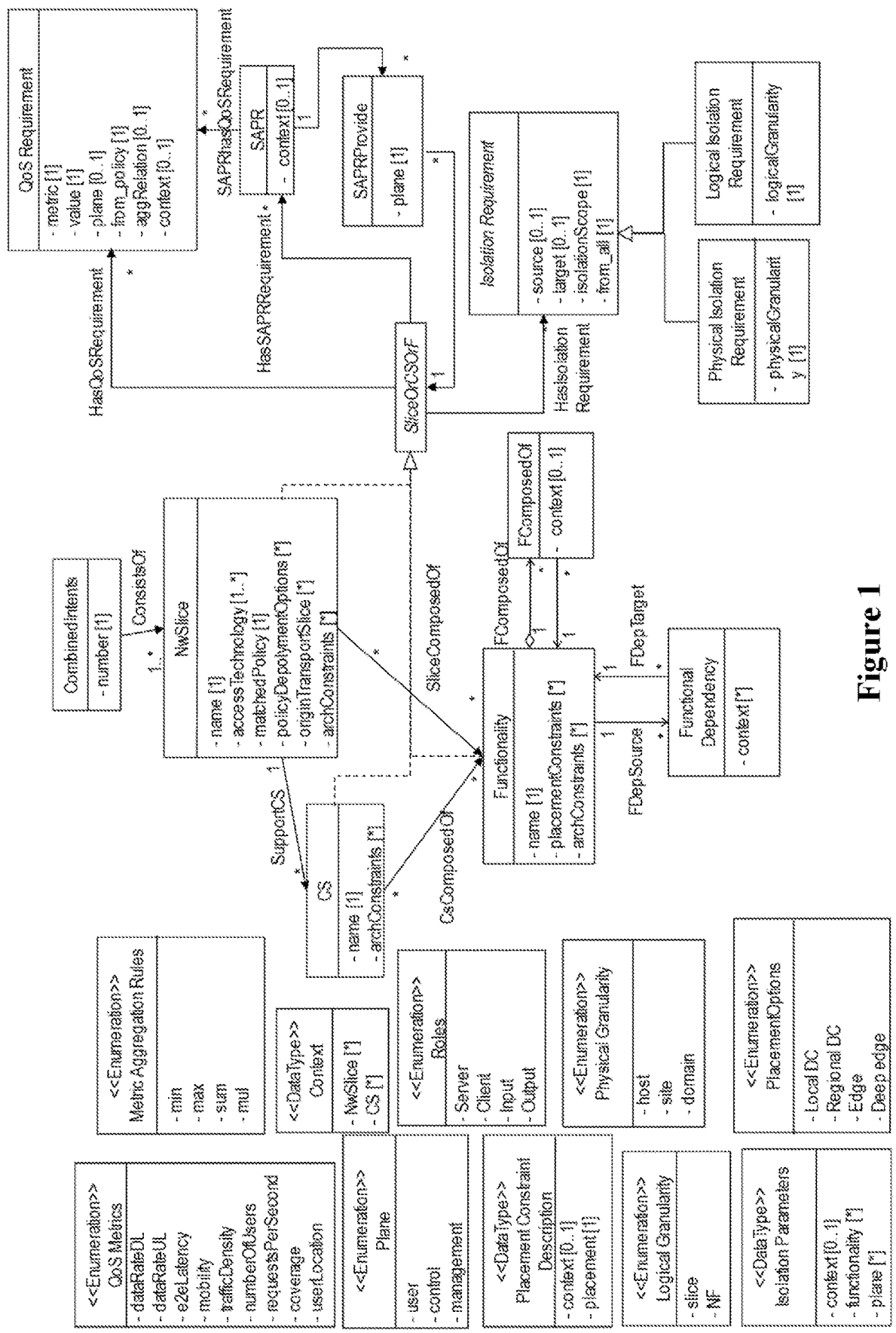
FIG. 1 is a diagram illustrating an example CombinedIntents metamodel.

A description of the Metamodels is provided below, starting with the CombinedIntents Metamodel describing combined User and Operator Intents, which is illustrated in FIG. 1.

The CombinedIntents metamodel allows the description of high-level requirements for requested NwSs including transport NwSs as well as NwSs supporting requested CSs and their applicable operator policies. A given combination of the user and the operator intents is expressed as a CombinedIntents model, which is an instance of the CombinedIntents metamodel.

Accordingly, a CombinedIntents model instance consists of one or multiple instances of the NwSlice element.

Each NwSlice, i.e. an instance of the NwSlice element, represents a requested NwS identified by a name and which has a set of attributes coming either from the user intent or from the operator intent in terms of a matched policy.

The matchedPolicy attribute of a NwSlice refers to the name of the applicable operator policy. This policy may require certain deployment options, which are described in the policyDeploymentOptions attribute.

A NwSlice might be the result of merging multiple transport NwSs, in which case, the NwSlice references the names of these transport NwSs in its originTransportSlice attribute.

Each instance of the CS element represents a requested CS and it is identified by a name. A NwSlice that was added to support some requested CSs has a SupportCS associations with these CSs.

For a CS or a NwSlice also a specific decomposition can be requested, which is expressed using respectively the CsComposedOf and the SliceComposedOf associations towards the requested composing functionalities described by instances of the Functionality element. In a similar manner, decomposition can be requested for instances of the Functionality element, which can be further decomposed using the FComposedOf associations. In addition, dependencies between instances of the Functionality element can be expressed using the Functional Dependency association. All these relations represent functional dependencies requested in the user intent.

Each instance of the Functionality element (i.e. a functionality) is identified by a name. The Functionality element allows one to specify placement constraints in the placementConstraints attribute, which may be limited only to a given context.

To request a specific placement for a functionality, an instance of the Placement Constraint Description element can be used, which includes two attributes: a placement (with possible values of Edge, Deep edge, Regional DC, Local DC) and a context within which the placement is applicable (i.e. NwSlice or CS). One should note that, in the future, other placement values may become available. This is also applicable for any other enumeration of values provided herein. When no context is specified, the required placement is considered for any NwSlice or any CS which has in its decomposition the given functionality (i.e. the given instance of the Functionality element). A functionality can only have one placement per context.

Instances of the NwSlice, the CS and the Functionality elements can also be constrained to particular architectures using the archConstraints attribute.

Isolation requirements may need to be described between NwSs, between CSs, and/or between their functionalities whether they belong to the same or different NwSs/CSs. Four isolation scopes were defined to express such isolation requirements:

Inter-slice: isolation requirements with this scope express non-sharing of physical and/or logical resources between NwSs (instances from the same NwSlice and/or from different NwSlices).

Intra-slice: isolation requirements with this scope express non-sharing of physical and/or logical resources within the same NwS (a given instance of the NwSlice element).

Inter-CS: isolation requirements with this scope express non-sharing of physical and/or logical resources between the CSs.

Intra-CS: isolation requirements with this scope express non-sharing of physical and/or logical resources between functionalities of a given CS.

An instance of the Isolation Requirement element is used to specify an isolation requirement. It indicates an isolationScope with one of the above values and whether full or partial isolation is required. For full isolation, the attribute from_all is set to "true" and the source attribute can be used to characterize further the isolation requirement (e.g. to which plane it is applicable). Plane includes user plane, control plane or management plane, which each carry different traffic, such as user generated traffic, signaling traffic and traffic for the management of infrastructure. For partial isolation, the from_all attribute is set to "false" and the target attribute specifies the applicability of the isolation to other instances (i.e. NwSlices, CommunicationServices, and/or Required Functionalities). The source and the target attributes are of type Isolation Parameters.

The instances of the Isolation Requirement elements are used to express both physical and logical isolation requirements at different granularities. They can be associated with instances of the NwSlice, the CS and/or the Functionality elements. For the granularities of physical isolation an enumeration was defined with values of "host", "site" and "domain". Similarly, the logical granularities were defined with values "slice" or "NF" (NF standing for network function).

Instances of the QoS Requirement element are used to specify the QoS requirements for a NwS, a CS and/or a functionality. A QoS requirement is defined as a metric (values of QoS Metrics enumeration e.g. dataRateDL, numberOfUsers), a value, a plane and optionally a context. A QoS requirement can be attached to an NwSlice, a CS and/or a functionality directly or through a service access point requirement (SAPR).

Figure 2:
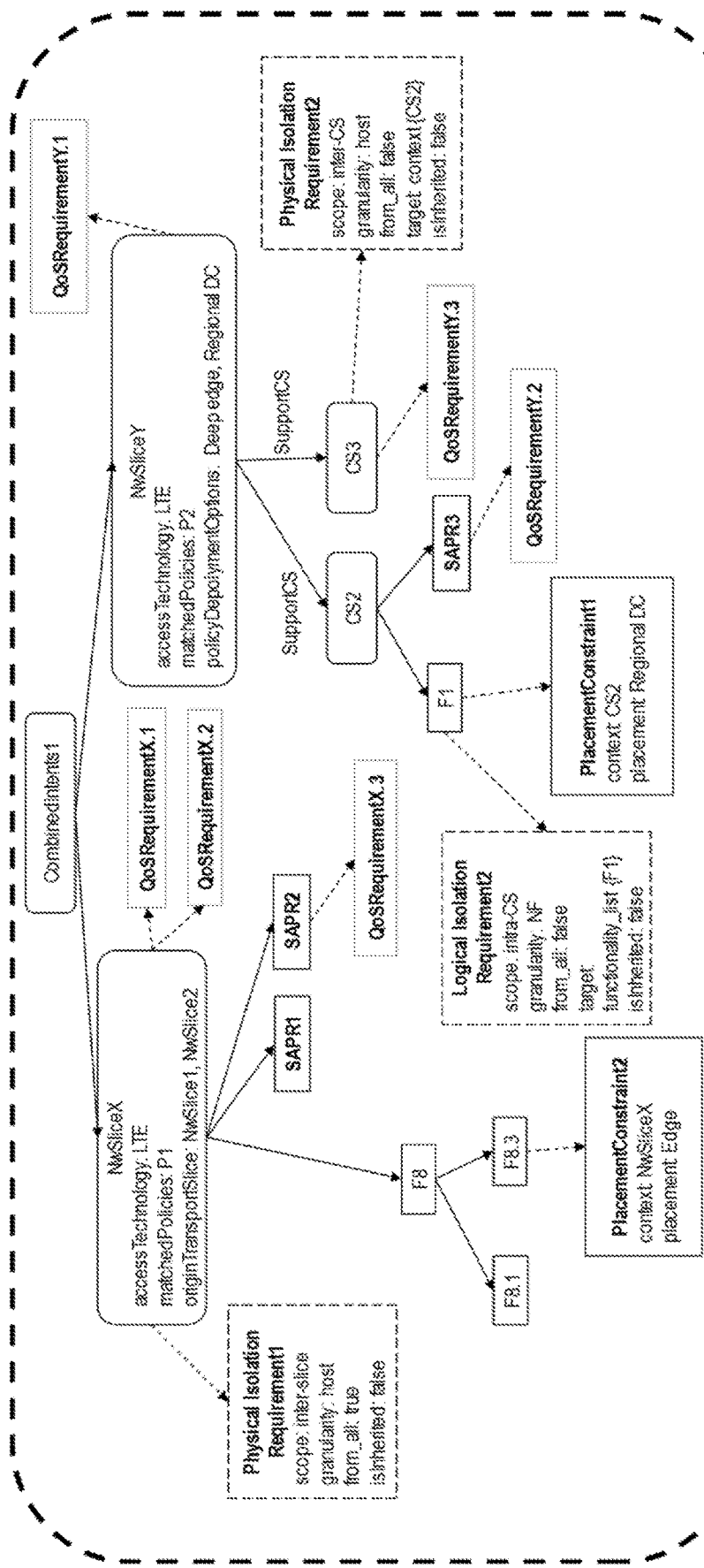
FIG. 2 is a schematic illustration of an example CombinedIntents Model.

FIG. 2 shows an example of a CombinedIntents model, in which two NwSlices are requested (NwSliceX and NwSliceY). NwSliceX is a transport slice and does not support any CS, while NwSliceY supports CS2 and CS3. NwSliceX is requested with LTE access technology, the same way as NwSliceY, which is also requested with LTE access technology. In this example, the originTransportSlice of NwSliceX refers to two NwSs, namely NwSlice1 and NwSlice2, which means that NwSliceX results from the merging of two NwSs: NwSlice1 and NwSlice2. For NwSliceY the matched policy requires certain deployment options specified by its policyDeploymentOptions attribute. Namely, the functionalities of NwSliceY can be placed only at the "Edge" and at the "Regional DC". NwSliceX requires functionality F8 composed of F8.1 and F8.3. For F8.3, the user intent requests a specific placement in the "Edge".

Regarding the isolation constraints, NwSliceX has a physical isolation requirement defined at the "inter-slice" scope with its from_all attribute set to "true". This means that NwSliceX needs to be physically isolated from all NwSs (i.e. NwSlices of the same CombinedIntents models, NwSs already running in the system and NwSs to be instantiated in the future).

A physical isolation requirement was specified for CS3 indicating that CS3 needs to be physically isolated from CS2 at the "host" level.

A logical isolation requirement was specified for functionality F1 at the "intra-CS" scope.

Finally, functionality F1 is required in the decomposition of CS2 and it has a placement constraint within this context (i.e. context of CS2) set to "Regional DC".

For the requested NwSlices and CSs, SAPRs and QoS requirements have been specified as well, which are beyond the scope of this discussion.

The NSliceOntology Metamodel is discussed next in relation with FIG. 3. A NSliceOntology model represents the knowledgebase used for designing network slices, end-to-end communication services, as well as individual functionalities. As aforementioned, a CombinedIntents model may be expressed without giving all the details about how to realize the requested NwSs and CSs from functional and architectural perspectives. Therefore, an NSliceOntology model collecting such detailed information from existing or known/standards deployment solutions can be used to facilitate the design task of implementing the NwSs and CSs requested in the CombinedIntents.

A NSliceOntology model is an instance of the NSliceOntology metamodel.

An instance of the Functionality element of the NSliceOntology metamodel represents a simple or complex functionality known by the knowledgebase. It is identified by a name and may have multiple aliases. Such a functionality may represent a NwS (i.e. isSlice attribute is set to "true"), a CS (i.e. isCS attribute is set to "true") or a functionality (i.e. both isSlice and isCS are set to "false"). In any case, it may have a list of allowedPlacements specified using an instance of the AllowedPlacement element. It has three attributes: the placement, which provides the list of allowed placements (possible values: "Edge", "Deep edge", "Regional DC", "Local DC"), the source specifying if the indicated placement values reflect the available implementations or are defined by standards (possible values: "implementation", "standard"), and the context, within which the placement is applicable (i.e. the name of a functionality corresponding to a NwS or a CS). A functionality may have different relations/associations with other functionalities in the knowledgebase.

The allowedPlacements attribute specified for a functionality in the NSliceOntology represents the placements supported by either the available implementations (e.g. VNFs, PNFs) realizing it (source attribute is "implementation") or by the standards (source attribute is "standard"). If the allowedPlacements attribute is not specified, this means that neither the standards nor the available implementations have any placement restrictions for the functionality.

The allowed placements attribute with source "implementation" of different functionalities are independent of each other regardless of any composition or other relations between these functionalities. This is because this attribute setting means that a separate implementation is available for each of these different functionalities. For instance, a functionality F1, which has as allowed placements "Edge" and "Regional DC" with source "implementation", can be decomposed into two functionalities F1.1 and F1.2, which have their own allowed placements empty (or set to other placement values). This means that F1, F1.1 and F1.2 each has their own implementation supporting the applicable list of placement(s).

In contrast, allowed placements for functionalities set according to "standard" apply to their constituent functionalities. For instance, an allowed placement "Deep edge" specified by the standard for functionality F2 is applicable to its constituent functionalities.

A functionality can be a composition of lower-level functionalities. In this case, ComposedOf associations are used to specify that these lower-level functionalities are in the decomposition of the functionality. A ComposedOf association is an instance of the ComposedOf element, which can specify the context of a decomposition and whether this decomposition is mandatory or optional within that context.

Since a CS needs to be supported by a NwS, when an instance of the Functionality element corresponds to a CS (i.e. isCS attribute set to "true"), it is associated with a functionality corresponding to a NwS (i.e. isSlice attribute is set to "true") through a SupportedBy association.

Functionalities composing a CS or a NwS can also depend on each other, and instances of the Functional Dependency element are used to express these dependencies. A functional dependency may be limited to a specific context.

A NwS, a CS or a functionality represented by an instance of the Functionality element may be realized by different architectural blocks represented by instances of the ArchBlock element. An instance of the ArchBlock element is identified by a name and may have aliases. It may be characterized by specific access technologies. For instance, we can define ArchBlocks for the 5G technology or for LTE using the technology attribute. This attribute helps to select the right ArchBlock for an NwSlice requested in a CombinedIntents model with a given accessTechnology.

An architectural block represented by an ArchBlock element can be further decomposed into smaller architectural blocks. Instances of the ArchComposition element are used to represent different decomposition alternatives for an ArchBlock.

An architectural block has at least one interface through which it communicates with other architectural blocks. Each interface is described as an instance of the Interface element and identified by a name. An interface is associated with at least one Interface Functional Characteristic, which represents a functionality exposed by the interface on a specific plane to the environment of the architectural block.

An ArchBlock may be connected to a Service Access Point (SAP), which is an instance of the SAP element. An SAP may have a context and it specifies using an instance of the SAP Interface element the interface of the ArchBlock the SAP exposes fully or partially. The exposed functional characteristics are specified by instances of the SAP Functional Characteristic element.

Similar to functionalities, architectural blocks may have dependency relations typically requiring interaction between them. The Architectural Dependency and the ADep Interfaces elements are used to describe the communication between two architectural blocks.

An instance of the Architectural Dependency element has a source and a target ArchBlock, and it may be applicable within a specific context. For instance, to realize a specific functionality an architectural block, which is decomposed into child architectural blocks, there is an architectural dependency among these child architectural blocks.

The client and the supplier characteristics of an architectural dependency are specified using instances of the ADep interfaces element, which defines the attributes describing the respective functionalities, interfaces, roles and protocols.

Figure 4:
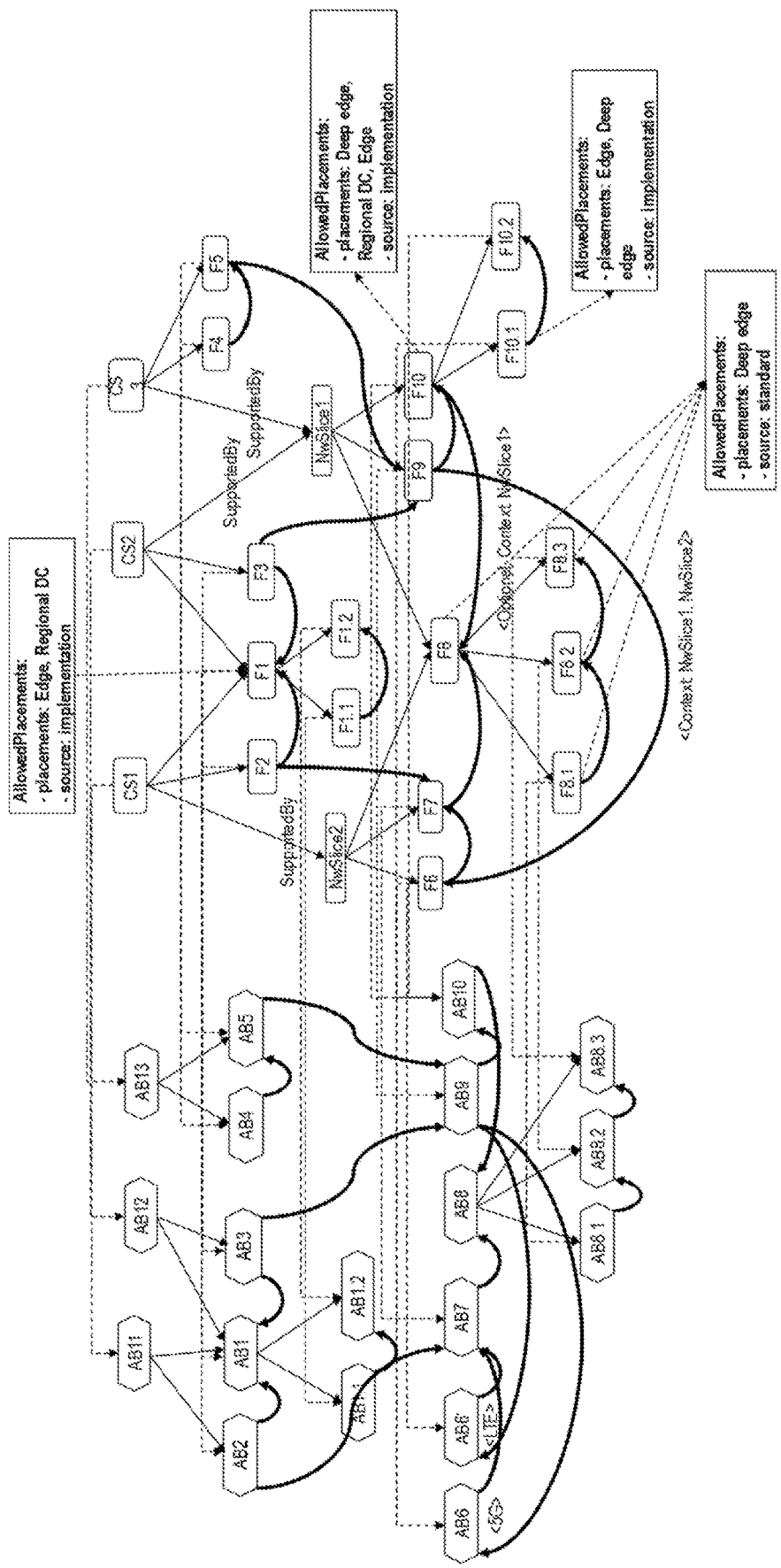
FIG. 4 is a schematic illustration of an example NSliceOntology Model.

FIG. 4 shows an example of a NSliceOntology. In this example on the right-hand side there are three instances of the Functionality element representing three CSs (their attribute isCS is set to true), namely CS1, CS2 and CS3 as part of the ontology. CS1 is supported by a functionality corresponding to a NwS (its attribute isSlice is set to "true"), namely NwSlice2. Similarly, CS2 and CS3 are supported by NwSlice1.

The decomposition relations for these elements have been defined as shown in the figure. For instance, NwSlice2 is composed of the functionalities F6, F7 and F8. In this example, all the FComposedOf relations are mandatory except the FComposedOf between F8 and F8.3, which is optional for NwSlice1.

In addition, this ontology specifies the dependencies between the different functionalities of the different CSs and NwSlices. For example, F9 of NwSlice1 has a functional dependency on F6 of NwSlice2. This dependency is applicable only when NwSlice1 and NwSlice2 are requested together.

The example NSliceOntology specifies as well the allowedPlacements for some functionalities, namely for F1, F10, F10.1 they are defined by the available implementations, while for F8, F8.1, F8.2 and F8.3 they are defined based on the standard.

The example shows the ArchBlocks realizing the different functionalities and their architectural dependencies.

Figure 5:
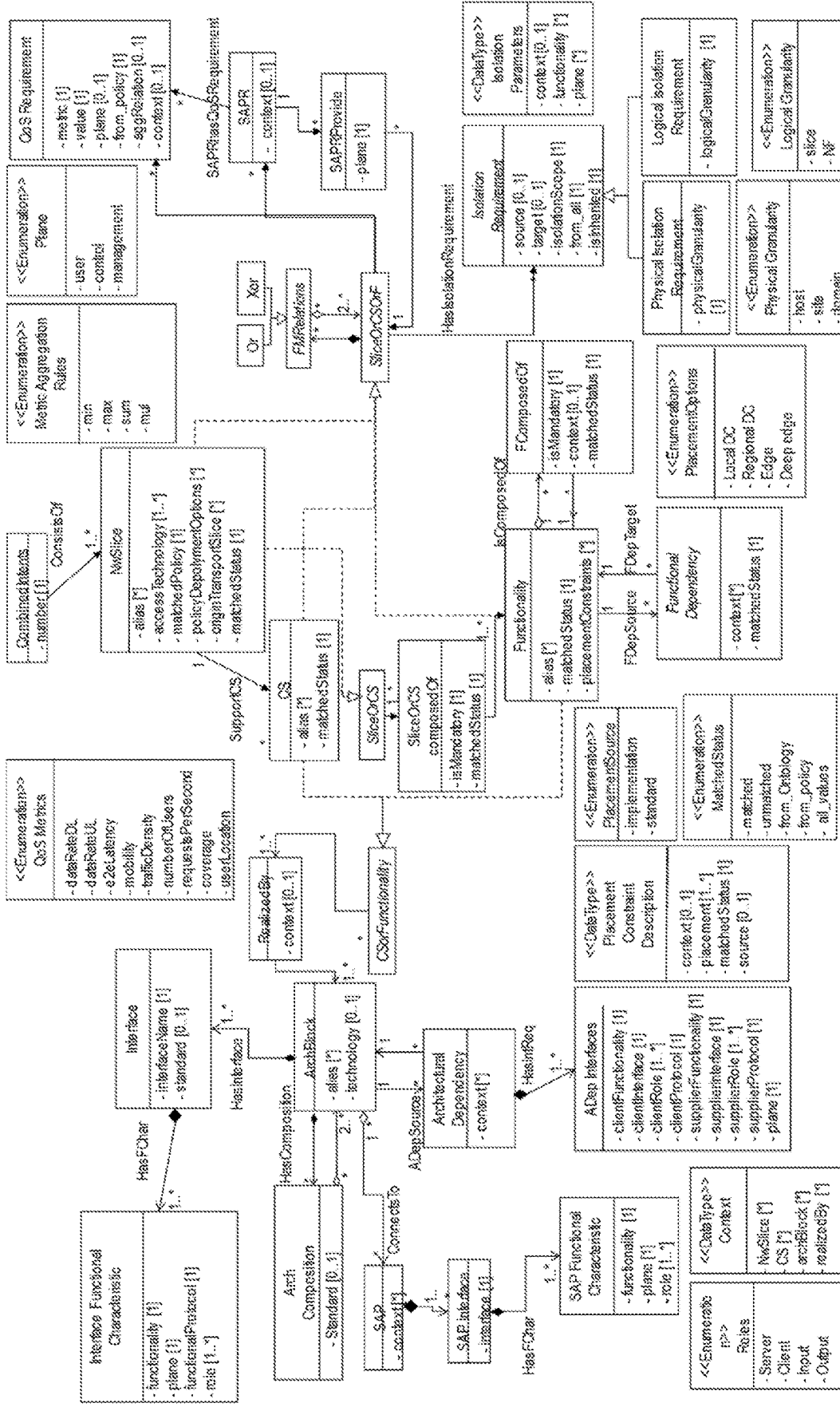
FIG. 5 is a diagram illustrating an example Solution Map Metamodel.

The Solution Map Metamodel will be described in relation with FIG. 5.

The solution map (SM) metamodel aggregates the results of the NwS design process step by step. An SM model represents the results of the functional and architectural decomposition of the input CombinedIntents model together with the placement constraints and the isolation requirements propagated as necessary to the composing elements.

Figure 3:
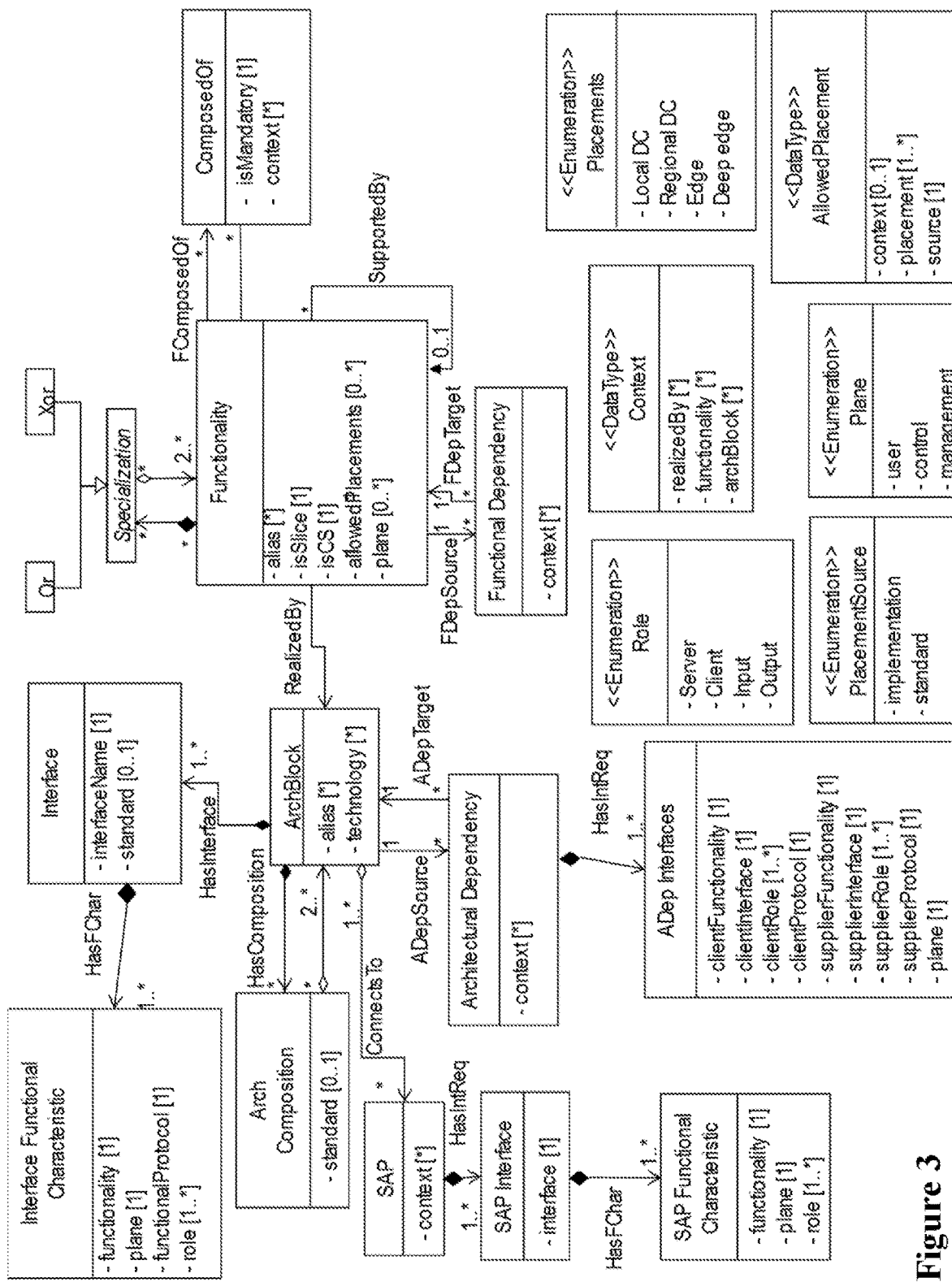
FIG. 3 is a diagram illustrating an example NSliceOntology Metamodel.

To be able to aggregate all the results, part of the SM metamodel is similar to the CombinedIntents metamodel presented in relation with FIG. 1, and part of it is similar to the NSliceOntology metamodel discussed in relation with FIG. 3.

The elements of the SM metamodel similar to the elements of the CombinedIntents metamodel have a matchedStatus attribute which keeps track whether a given instance of the element has or have not been addressed yet during the design process by matching it to a known solution.

In the SM, a functionality or a CS may be realized by one or multiple architectural block elements.

An instance of the Functionality element of the SM model, may have multiple placementConstraints attributes, each specifying a list of placements within a context. The placement values of the list within the same context have a logical "and" relation meaning that the concerned functionality should be placed/available at each values on the list. While different instances of the placementConstraints attribute are in a logical "or" relation as they specify alternative placements.

For instance, functionality F1 can have two placementConstraints attributes with placement values respectively: "Edge" and "Local DC". This means that an instance of F1 can be placed in the edge or in the local DC.

However, if F1 has a placementConstraints attribute defined with a placement list "Edge, Local DC". This means that instances of F1 need to be placed at the edge and in the local DC. In addition, the combination of the placement constraints of the functionalities composing F1 should satisfy the placementConstraints of F1. For instance, if F1 is composed of F1.1 and F1.2, then functionality F1.1 could have a placementConstraints attribute defined with a placement value of "Edge", while functionality F1.2 would have a placementConstraints attribute defined with a placement value of "Local DC", thus combining together into "Edge, Local DC" of F1.

More details and examples of the SM model will be presented below in relation with a method consisting of three main steps: decomposing the combined user and operator intents using the ontology; setting the placement constraints for the functionalities; and propagating the isolation requirements.

The SM model resulting from this method describes all the constituents necessary to deploy the requested NwSs and CSs with the matched placement constraints and the isolation requirements applicable to each of the constituents (VNFs and PNFs implementing the architectural blocks associated with the functionalities) and can be used to deploy the NwSs and CSs as intended by the user and in compliance with the operator's policies as well as with applicable standards.

Figure 6:
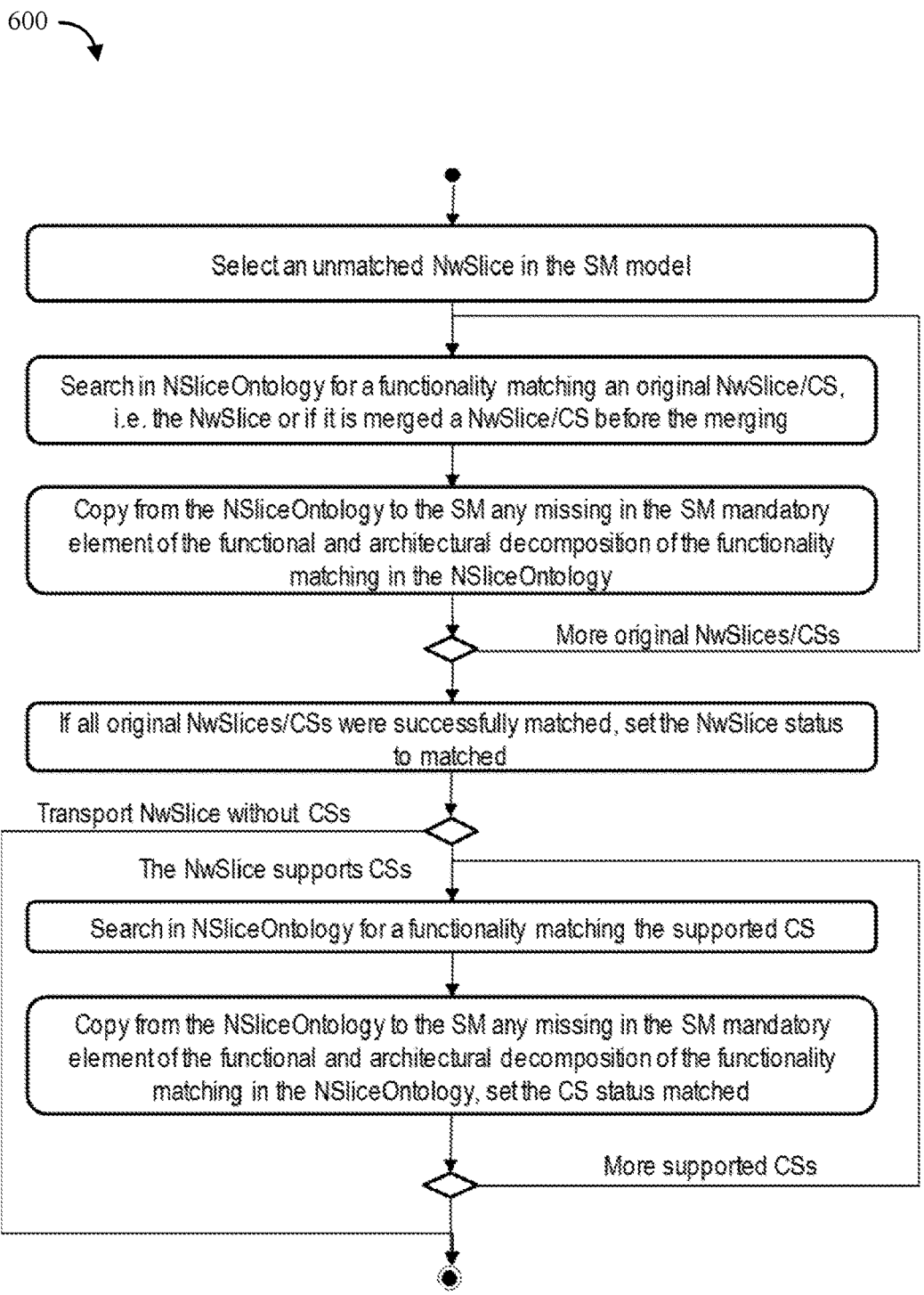
FIG. 6 is a flowchart of a method for decomposition of combined user and operator intents using an ontology.

A method 600 for decomposing the combined user and operator intents using the ontology is illustrated in FIG. 6 and described below.

The user and operator intents are combined in a CombinedIntents model, which consists of high-level requirements and therefore typically does not include all implementation details for the requested NwSs and CSs. To be able to select the appropriate resources (e.g. VNFs, PNFs) to deploy the requested NwSs and CSs an ontology can be used, which collects all the knowledge currently available about NwSs, CSs and individual functionalities.

An NSliceOntology model is such an ontology. It includes the known functionalities needed for different known CSs, NwSs and complex functionalities, as well as the different architectural blocks that can realize these functionalities including the information about dependencies, interfaces and SAPs. Hence, in this step from the combined intents an SM model is created, and the requested NwSlices and CSs are decomposed into constituent functionalities and the implementation details of these functionalities based on the information available in the NSliceOntology.

To do so the functionalities representing requested functionalities (NwSs, CSs and possibly their constituent child functionalities) are matched with the functionalities in the ontology and for each match (i.e. match of functionality and any requested decomposition and relations) all additional mandatory details (functionalities, architectural blocks and their relations) present in the ontology, are added to the functionalities being matched in the SM model. The matched elements in the SM model are tagged (matchedStatus set) as "matched", while the elements added from the ontology are tagged as "from ontology".

Matching is also performed for all the original NwSs and CSs that have been merged into a single NwSlice. In this case, the NwSlice representing the merge is tagged as "matched" only when a match is found for all the indicated original NwSs and/or CSs. For instance, let us consider NwSlice "NwSliceZ" resulting from the merge of the eMBB NwS and the mMTC NwS requested originally. In the SM model, the NwSliceZ does not have any SliceOrCScomposedOf relation. In the NSliceOntology, decompositions for the eMBB and the mMTC NwSs are available: eMBB is composed of F1 (mandatory), F2 (mandatory), F3 (Optional) and mMTC is composed of F4 (mandatory) and F5 (mandatory). These decompositions are added from the NSliceOntology to the SM model. As a result, functionalities F1, F2, F4 are added to the SM and a SliceOrCScomposedOf relation is added to NwSliceZ with each of these functionalities.

The dependency, decomposition and realization relations of the elements added to the SM are set according to the contexts defined by the original NwSs.

The ArchBlocks realizing a functionality are selected from the ontology for the addition to the SM based on the applicable archConstraints attribute and the access technology attribute of the NwSlice of the SM.

Figure 7:
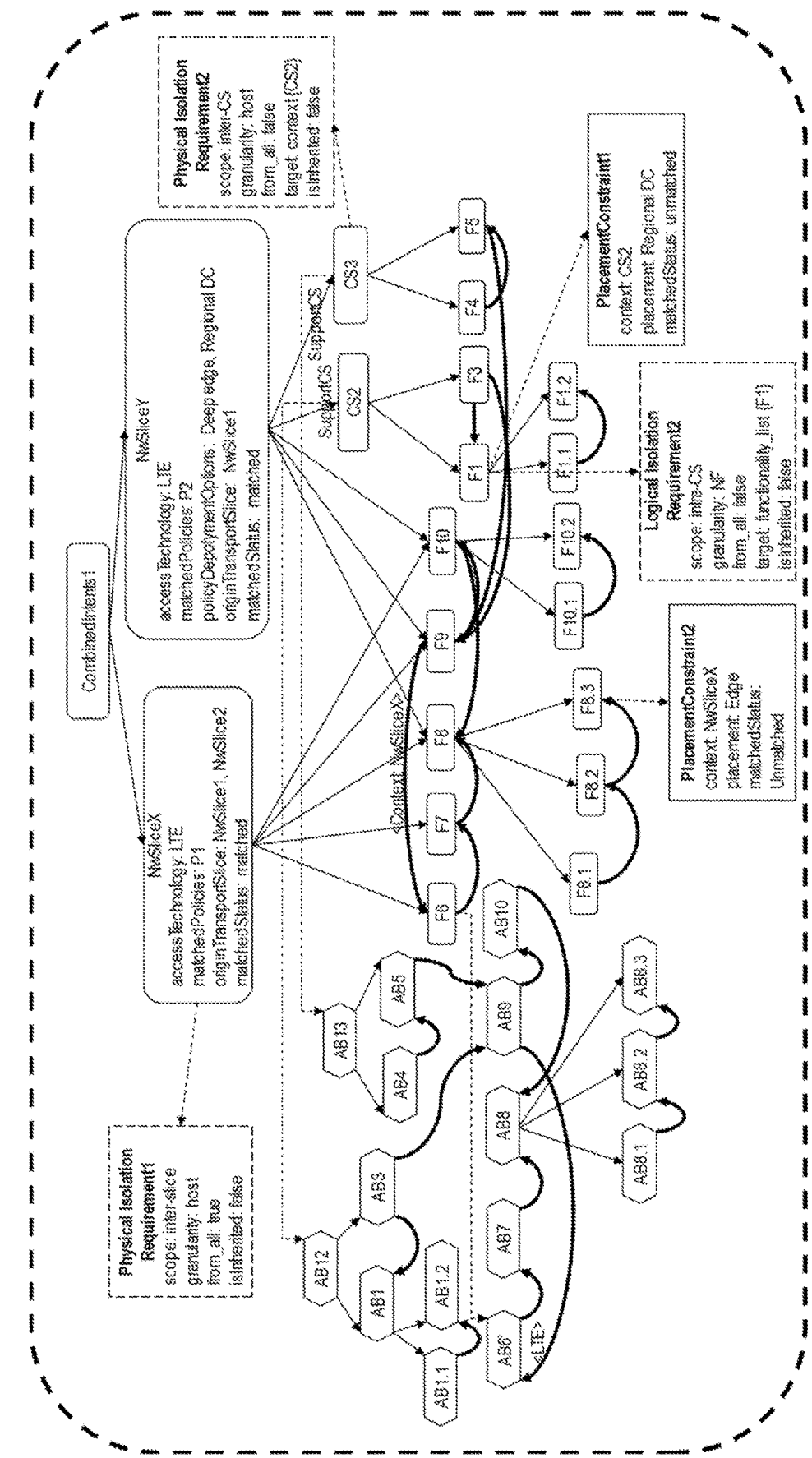
FIG. 7 is a schematic illustration of an example SM model showing the decomposition of CombinedIntents1.

As an illustration of the decomposition step, the example of the CombinedIntents model shown in FIG. 2 and the example of the NSliceOntology model shown in FIG. 4 are used. FIG. 7 shows the SM model resulting from the decomposition step.

NwSliceX of FIG. 2 does not support any CS and it references two NwSlices in its originTransportSlice attribute, i.e. NwSlice1 and NwSlice2. For the decomposition of NwSliceX, the NSliceOntology model is searched for functionalities matching NwSlice1 and NwSlice2. The NSliceOntology model of FIG. 4 defines the decompositions for NwSlice1 and for NwSlice2. Consequently, the functionalities composing NwSlice1 and NwSlice2 in the NSliceOntology are added to the SM model with their respective subtrees of functionalities. A SliceOrCScomposedOf relation is created between these functionalities and NwSliceX.

The architectural blocks are added for each functionality. For instance, according to the NSliceOntology functionality, F6 can be realized by architectural blocks AB6 or AB6'. AB6 is specific to 5G technologies and AB6' is specific to LTE technologies. Since NwSliceX has LTE as its access technology, AB6' is selected and added for F6 in the context of NwSliceX. The realizedBy relation with F6 is set for context NwSliceX. Functionality F6 does not define any further details. Thus, the decomposition of NwSliceX is complete.

In FIG. 2, NwSliceY supports two CSs, namely CS2 and CS3, and its originTransportSlice attribute references NwSlice1. Thus, the two requested CSs and NwSlice1 are decomposed again using the NSliceOntology of FIG. 4.

In the NSliceOntology model, CS2 and CS3 are supported by NwSlice1, therefore the mandatory portion of the subtree of NwSlice1 is added from the ontology to NwSliceY of the SM. Since NwSlice1 of the ontology matches the originTransportSlice attribute of NwSliceY of the SM, no further processing is needed. Next CS2 and CS3 of the SM are decomposed according to the NSliceOntology model. I.e. the appropriate subtrees of functionalities are added from the ontology to the SM model. For each child functionality, the realizedBy relation and the decompositions relations are set, and the dependencies are defined for the context of CS2, CS3, or NwSlice1.

The step of setting the placement constraints for the functionalities will now be described. In this step, the placement constraints and/or the policy deployment options of the SM model are checked against the allowed placements information originating from the NSliceOntology model.

At this point each NwSlice and CS has been fully decomposed in the SM model. Regarding the placement information:

functionalities originating from the CombinedIntents model may have placement constraints;

each NwSlice has the information about the matched operator policy and may have associated deployment options; and functionalities other than NwSs or CSs may have one or more allowed placements originating from the NSliceOntology model originating from the available implementation (e.g. VNFs, PNFs) or standards.

The same processing described below is repeated for each NwSlice of the SM model.

For the selected NwSlice, the placement constraints of the CSs that the NwSlice supports and the functionalities that compose the NwSlice are handled together with the deployment options associated with the NwSlice.

Since the placement constraints in the SM model represent user intents, they have been specified only for top/higher-level (in terms of the decomposition) functionalities of a given NwSlice as per user intent. I.e. they are present only for functionalities indicated by the user and not for their functional decomposition added from the ontology in the decomposition step.

The placements constraints of these top/higher-level functionalities are applied to the functionalities added as part of the functional decomposition. Therefore, the top/high-level functionalities with placement constraints are selected one by one, and the placement constraints of each such selected parent functionality are propagated to all its constituent child functionalities by setting their placements constraints/attributes for the same values.

Once the placement constraints have been propagated in the SM, they are checked against the allowed placements values for the corresponding functionality in the NSliceOntology whether there is a match. This processing depends on the source value of the allowedPlacements attribute of the corresponding functionality in the NSliceOntology, the source of which could be "implementation" or "standard".

A placement constraints attribute in the SM model matches an allowed placements attribute defined in the NSliceOntology, when all of its placement values are included in the placement values specified by the allowed placements. I.e. the placement constraints are a subset of the allowed placements.

First, those placement constraints are processed in a top-down manner for which the allowed placements attributes in the ontology have the source attribute set to "standard". Then, the placement constraints for which the allowed placements source attribute is set to "implementation" are processed in a bottom-up approach. Finally, the placement constraints matchedStatus is set to "all_values", "from_policy" or "from_Ontology".

Figure 8:
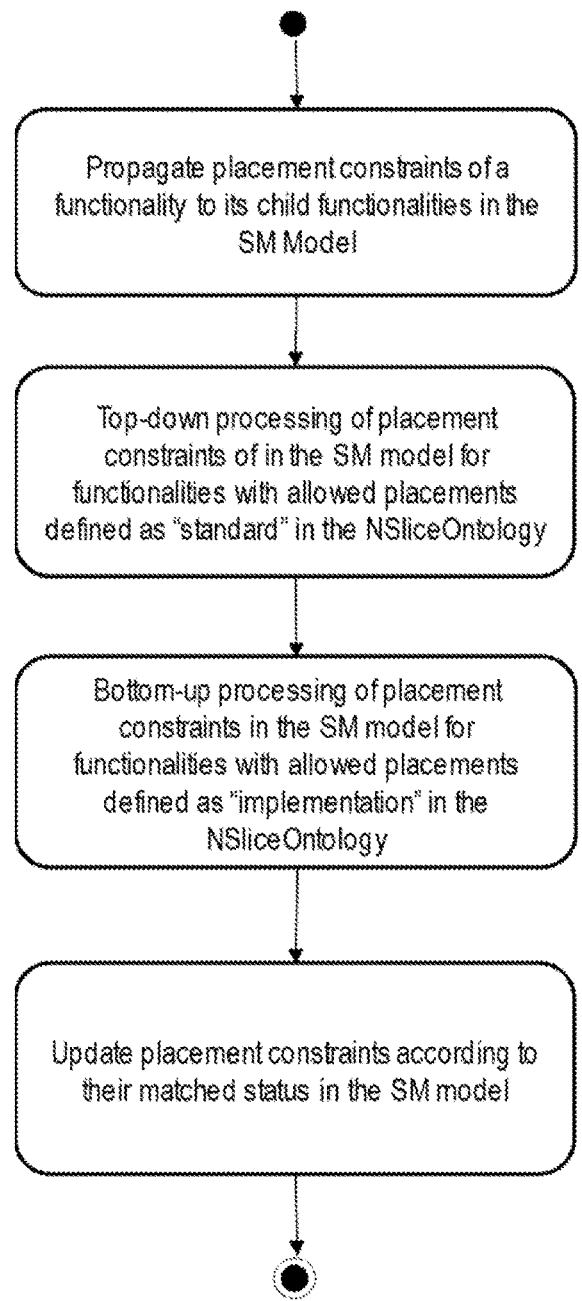
FIG. 8 is a flowchart of a method for propagation of placement constraints in the SM model.

FIG. 8 is the flowchart of a method 800 for placement propagation. Note that this propagation step could be performed interleaved with the decomposition step. I.e. each time a subtree of functionalities is copied over from the ontology to the SM, the placement constraints of the root of the copied subtree can be propagated down in the subtree.

Figure 9:
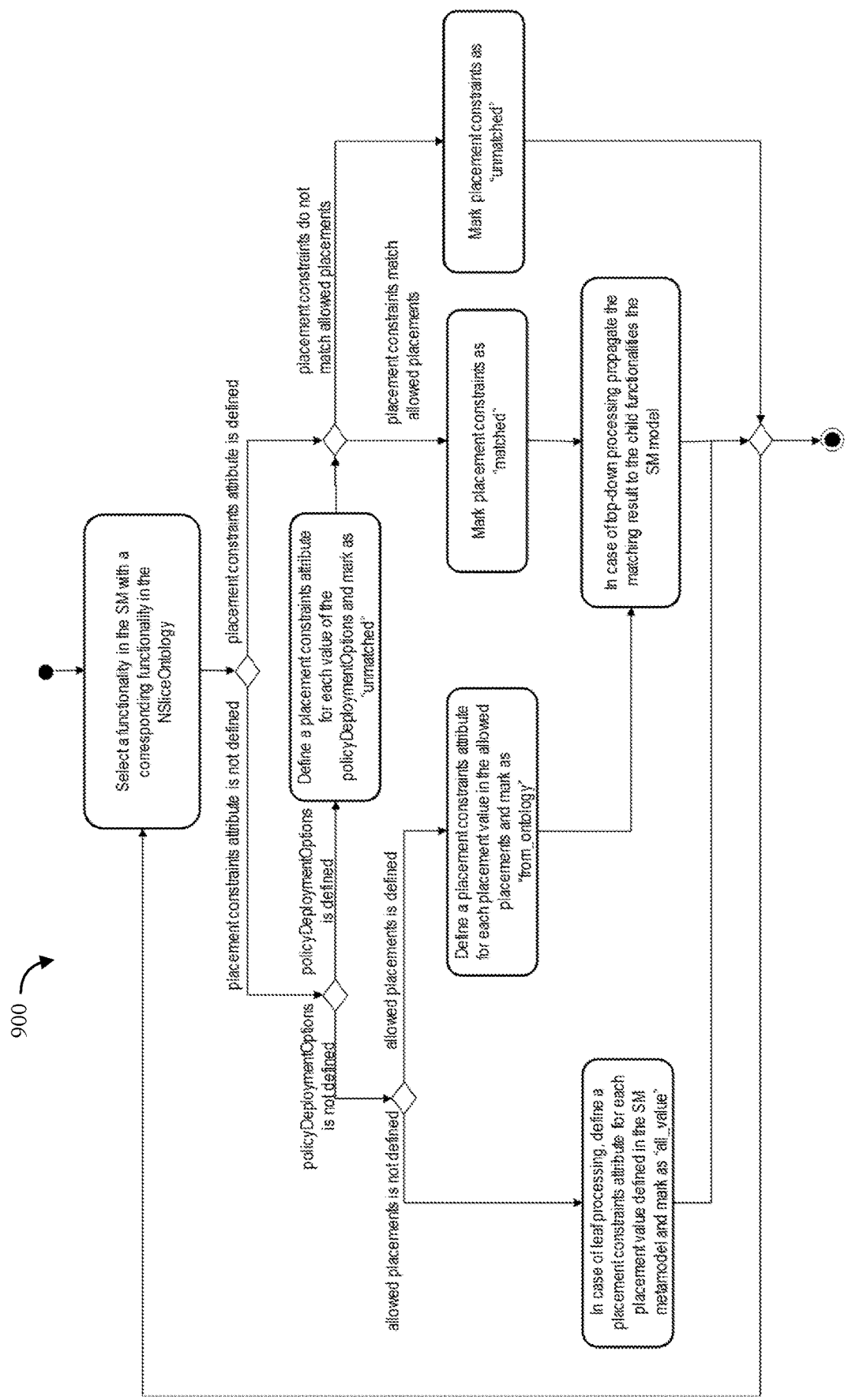
FIG. 9 is a flowchart of a method for generic placement constraints processing.

FIG. 9 is the flowchart of a method 900 for generic placement constraints processing. As described next, different variants of this flowchart are used depending on whether the traversal is top-down, bottom-up or the leaf functionalities are processed.

Top-down processing of placement constraints to match standard placements. In this variant, the SM model is traversed top-down to assign to "unmatched" (matchedStatus attribute set to "unmatched") placement constraints of functionalities values matching the "standard" (source attribute is set to "standard") allowed placements of corresponding functionalities of the ontology. Different cases are distinguished as described below.

If a functionality in the SM has placement constraints and its corresponding functionality in the NSliceOntology has "standard" allowed placements defined, the placement constraints are compared with the allowed placements and if they are all included—there is a match—, the placement constraint is tagged as "matched" and the source attribute is set to "standard". Otherwise the placement constraint is tagged as "unmatched".

If a functionality in the SM does not have placement constraints, but its corresponding functionality in the NSliceOntology has "standard" allowed placements defined and the parent NwSlice has its policyDeploymentOptions set, for each placement value of the policyDeploymentOptions of the parent NwSlice a placement constraints attribute is created with the matchedStatus set to "unmatched", then these placement constraints are matched to the allowed placements as in the previous case. For each matching placement constraints attribute the matchedStatus is changed to "matched" and the source attribute is set to "standard".

If a functionality in the SM does not have placement constraints, its corresponding functionality element in the NSliceOntology has "standard" allowed placements defined and the parent NwSlice does not have policyDeploymentOptions, for each placement value of the allowed placements a placement constraints attribute is created for the functionality with matched status set to "from_Ontology" and the source attribute is set to "standard".

In each case the results of the matching are propagated to the child functionalities composing the functionality. Cases not mentioned need no processing in this step.

Bottom-up processing of placement constraints to match implementation placements. In this variant, the placement constraints of leaf functionalities (those that are not decomposed any further) of the SM are processed first.

If a leaf functionality has no or unmatched placement constraints with source "standard", it is set or updated according to the allowed placements defined in the ontology by the implementation (source is set to "implementation") for the corresponding functionality. The following cases are distinguished.

If a leaf functionality in the SM has a placement constraints attribute defined, and its corresponding functionality in the ontology has allowed placements. The placement constraints are checked against the allowed placements attribute and if they match (they are included) the placement constraint is tagged as "matched" and the source attribute is set to "implementation". Otherwise, it is tagged as "unmatched".

If a leaf functionality in the SM has a placement constraints attribute defined, and allowed placements are not specified for its corresponding functionality in the NSliceOntology, the placement constraints is set as "matched".

If a leaf functionality in the SM does not have any placement constraints, its corresponding functionality in the ontology has allowed placements and the parent NwSlice has policyDeploymentOptions defined. In this case, for each placement value of the policyDeploymentOptions of the NwSlice a placement constraints attribute is created with the matchedStatus "unmatched". Then these placement constraints are matched to the allowed placements, and for each matching placement constraints attribute the matchedStatus is changed to "matched" and the source attribute is set to "implementation".

If a leaf functionality in the SM does not have any placement constraints, its corresponding functionality in the ontology has allowed placements and the policyDeploymentOptions are not defined for the parent NwSlice. Then, for each placement value in the allowed placements attribute a placement constraint is created and its matchedStatus is set to "from_Ontology" and the source attribute is set to "implementation".

If a leaf functionality in the SM does not have any placement constraints, its corresponding functionality in the ontology has no allowed placements, however, policyDeploymentOptions are specified for the parent NwSlice. Then, for each value in the policyDeploymentOptions, a placement constraints attribute is created for the functionality and its matched status is set to "from_policy".

If a leaf functionality in the SM does not have any placement constraints, its corresponding functionality in the ontology has no allowed placements and the policyDeploymentOptions are not specified for the NwSlice. Then, a placement constraints attribute is defined for each possible placement value defined by the SM metamodel, and its matched status is set to "all_values".

Once the placement constraints of leaf functionalities have been set, the SM model is traversed bottom-up to match the placement constraints of functionalities whose placement constraints attribute is not matched yet (matchedStatus is tagged as "unmatched" including those whose source is "standard") and whose corresponding functionality in the NSliceOntology has allowed placements set by the available implementations or has no allowed placements restriction. With this approach it is ensured that even if a requested placement does not match the standard placement, a solution will be generated as long as an implementation exists with the requested placement.

Depending on the available placement information the following cases are distinguished.

If a functionality in the SM model does not have a placement constraint within the context of its parent NwSlice/CS and its corresponding functionality in the ontology does not specify an allowed placement.

In this case the functionality in the SM will have its placement constraints attributes set as combinations of the placement constraints of its constituent child functionalities. If a combination includes "unmatched" placement constraints (all placement constraints of a child functionality have their matchedStatus set as "unmatched"), then the combined placement constraints attribute is also set as "unmatched".

For instance, functionality F1, composed of child functionalities F1.1 and F1.2, will have its placements constraints set based on the matched placement constraints of its child functionalities F1.1 (with matched placement constraint "Edge") and F1.2 (with two placement constraints set from policyDeploymentOptions to values "Edge" and "Deep edge"). As a result, two placement constraints attributes are defined for F1 as the combinations of the placement constraints of F1.1 and F1.2: placementConstraint1 with a placement value of "Edge" and placementConstraint2 with value "Edge, Deep edge".

If a functionality in the SM model has a placement constraint defined within the context of the parent NwSlice/CS and its corresponding functionality in the ontology has allowed placements specified.

Then the placement constraints are checked if they are all included in the allowed placements. If it is the case, the placement constraint will be tagged as "matched" in the SM model and its source attribute is set to "implementation". If any of the placement values are not included, the placement constraint will be tagged as "unmatched".

If a functionality in the SM model does not have a placement constraint defined within the context of the parent NwSlice/CS and its corresponding functionality in the ontology has allowed placements defined.

To create the placement constraints for the functionality in the SM model, the placement constraints of its child functionalities are collected and combined. These combined placement constraints are then matched with the allowed placements. If any of the placement values of a placement constraints is not included in the allowed placements, the placement constraints is tagged as "unmatched". For placement constraints that match (all placement values are included in the allowed placements), the placement constraints attribute is tagged as "matched" and its source attribute is set to "implementation".

For instance, functionality F1 has two child functionalities: F1.1 (placement constraint is "matched" for value "Edge") and F1.2 (two placement constraints set from policyDeploymentOptions with values "Edge" and "Deep edge"). The corresponding functionality in the NSliceOntology has an allowed placement "Edge". First, two placement constraints are assigned to F1: placementConstraint1 with a placement value "Edge" and placementConstraint2 with value "Edge, Deep edge". These are then checked against the allowed placements and placementConstraint1 matches the allowed placements value and set as "matched" with source as "implementation", while placementConstraint2 does not match, hence set as "unmatched".

If a functionality in the SM model has placement constraints defined within the context of the NwSlice/CS and its corresponding functionality in the ontology has no allowed placements defined.

If the placement constraints attributes are set as matched (matchedStatus is different from "unmatched") for all child functionalities of the functionality, then the placements constraints of this functionality are also set as "matched". Note that no source is set since the ontology has no allowed placements.

Updating the placement constraints according to their matchedStatus. In this step, the SM model is traversed to synchronize the placement constraints defined for parent functionalities and their constituent child functionalities.

For each functionality having its placement constraints set to "implementation" in the SM model, it is checked if any of its child functionalities have a placement constraints attribute for which the matchedStatus attribute is set to "from_Ontology", "from_policy" or "all_values". If so, the placement constraints of the child functionality are checked for placement values in addition to those that the parent functionality has. Any such additional placement value is removed from the placement constraints of the child functionality.

For instance, functionality F1 (placement constraint with value "Edge" and matchedStatus "from_Ontology") has two child functionalities: F1.1 (placement constraint with value "Edge" and matchedStatus "matched") and F1.2 (two placement constraints with values "Edge" and "Deep edge", and both with matchedStatus "from_policy"). F1 does not have a parent functionality in the SM model. The placement constraints of its child functionalities are updated as follows: No action is taken for F1.1. However for F1.2 since it has a placement constraint with the matchedStatus "from_policy" and it has an additional placement value (i.e. "Deep edge") compared to the placements constraints of F1, the placement constraints of F1.2 is updated by removing the placement constraints attribute with the value of "Deep edge".

Figure 10:
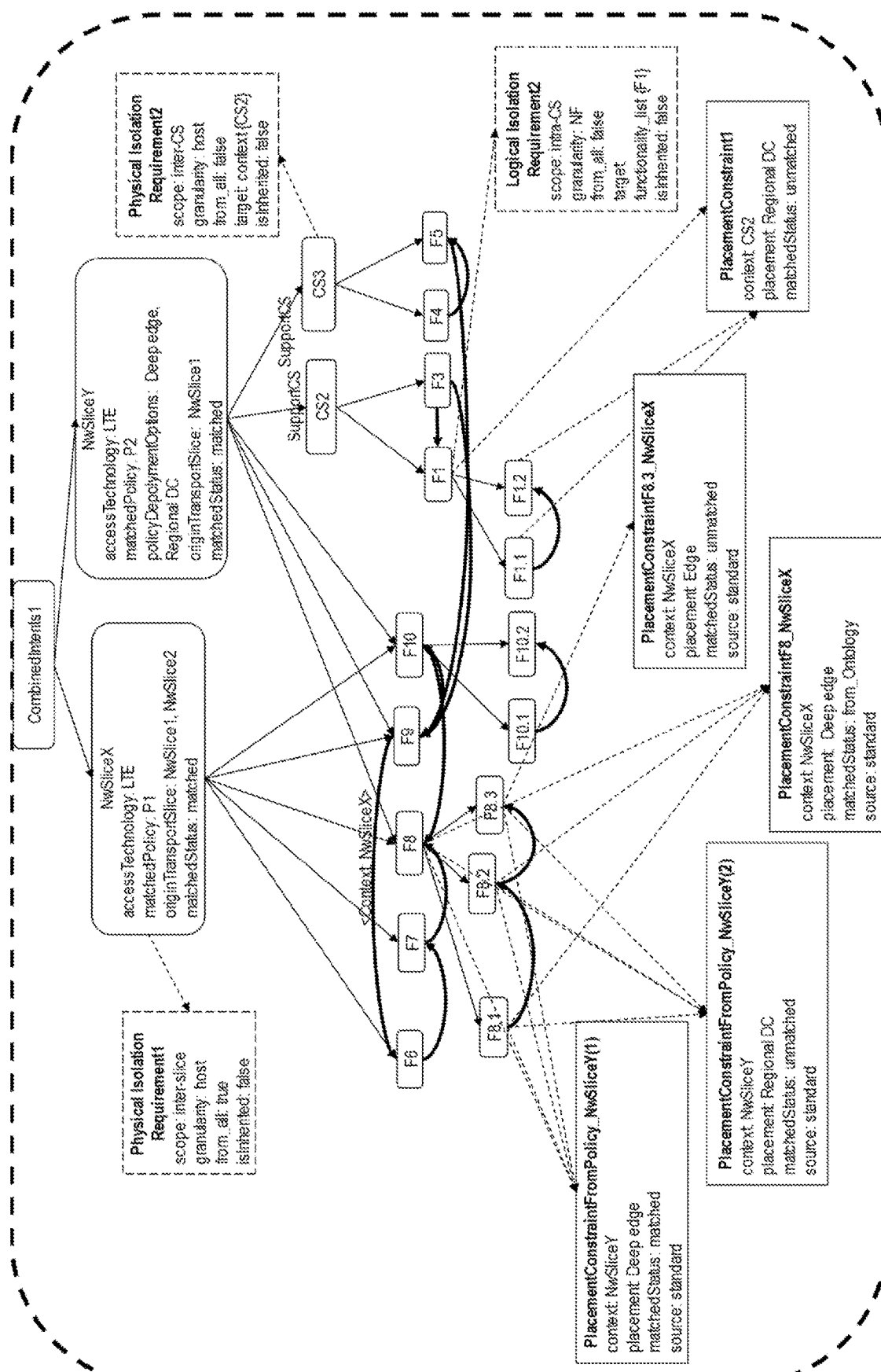
FIG. 10 is a schematic illustration of an example of a partial SM model after setting the placement constraints by top-down processing.

As an illustration of the step of setting the placement constraints for the functionalities, the example SM model resulting from the previous step shown in FIG. 7 and the NSliceOntology shown in FIG. 4 are considered. The updated SM model as a result of this step is shown in FIG. 10 (note that the ArchBlock elements of the SM are omitted from the figure).

First, the placement constraints defined for parent functionalities in the SM model are propagated to their child functionalities. In this example according to FIG. 7, functionality F1 has a placement constraints attribute defined, which is propagated to its child functionalities F1.1 and F1.2. Functionality F8.3 also has a placement constraints attribute defined in the context of NwSliceX, but it is a leaf functionality, so no propagation is needed.

Top-down processing to match standard placements. In this step, placement constraints of those functionalities of the SM are set whose corresponding functionalities in the NSliceOntology (shown in FIG. 4) have allowed placements defined according to the standard. F8 and its composing functionalities F8.1, F8.2 and F8.3, have allowed placements defined according to the standard.

In the SM of FIG. 7, F8 is child to both NwSliceX and NwSliceY, so the matching is performed for each context separately. F8 does not have any placement constraints.

In the context of NwSliceY, the placement constraints are created based on the policyDeploymentOptions of NwSliceY and then these are matched to the allowed placements of F8 in the ontology, which results in a match only for the placement constraints attribute with the placement value of "Deep edge". The same process is performed for F8.1, F8.2 and F8.3. The source attribute of these placement constraints is set to "standard".

In the context of NwSliceX, the placement constraints attribute of F8 in the SM is set with the value of the allowed placements of F8 in the NSliceOntology. Accordingly, its matchedStatus is set to "from_Ontology" (similarly for F8.1 and F8.2) and its source attribute is set to "standard". Functionality F8.3 has a placement constraint with value "Edge", which does not match to the allowed placements of F8.3 in the ontology. Therefore, its matchedStatus is set as "unmatched" with source "standard".

Bottom-up processing to match implementation placements.

For NwSliceY of the SM model (FIG. 7), the placement constraints are set for leaf functionalities, i.e. for F1.1, F1.2, F3, F4, F5, F8.1, F8.2, F8.3, F9, F10.1 and F10.2.

In this step, placement constraints are matched only for those functionalities of the SM:
 whose corresponding functionalities in the NSliceOntology have allowed placements defined based on available implementations (i.e. source attribute is set to "implementation"),
 have unmatched placement constraints with a source attribute set to "standard", or
 have no allowed placements defined.

From the list of leaf functionalities F8.1, and F8.2 have their allowed placements set according to standards therefore this step does not apply to them.

F8.3 has unmatched placement constraints with source set to "standard". Its corresponding functionality in the NSliceOntology does not have any "standard" allowed placements therefore no further processing is done for F8.3.

Functionalities F3, F4, F5, F9 and F10.2 do not have placement constraints in the SM. Also, their corresponding functionalities in the NSliceOntology do not have allowed placements. However, NwSliceY has policyDeploymentOptions defined. Accordingly, two placement constraints attributes are defined for each of these functionalities: one with the placement value "Deep edge" and the other attribute with the value "Regional DC". Both placement constraints will have their context set to "NwSliceY" and matchedStatus to "from_policy".

Functionalities F1.1 and F1.2 have placement constraints in the SM model, but their corresponding functionalities in the NSliceOntology do not specify allowed placements. Therefore, their placement constraint will be tagged as "matched" in the SM model.

Functionality F10.1 does not have placement constraints in the SM model, and its corresponding functionality in the NSliceOntology has allowed placements with the value "Deep edge, Edge". In this case, the policyDeploymentOptions of the parent NwSliceY are used to create unmatched placement constraints, which then are matched to the allowed placements in the ontology. A match is found for F10.1 for the placement constraints attribute with the value "Deep edge", for which the context is set to NwSliceY and the matchedStatus to "matched" with source "implementation".

The traversing of the SM model continues bottom-up with functionalities F1 and F10.

In the SM model functionality F1 has a placement constraints attribute defined with a placement value "Regional DC". Its corresponding functionality in the NSliceOntology has the allowed placements set to "Edge, Regional DC".

Thus, there is a match and the matchedStatus is set to "matched" with the source "implementation".

Functionality F10 in the SM does not have any placement constraints while its corresponding functionality in the NSliceOntology has allowed placements set to "Edge, Deep edge, Regional DC". In this case, the placement constraints of the child functionalities of F10—namely F10.1 and F10.2—are collected. Two placements constraints are created for F10:
 PlacementConstraintF10_NwSliceY(1) with a placement value of "Deep edge", and
 PlacementConstraintF10_NwSliceY(2) with a placement value of "Deep edge, Regional DC".

Figure 11:
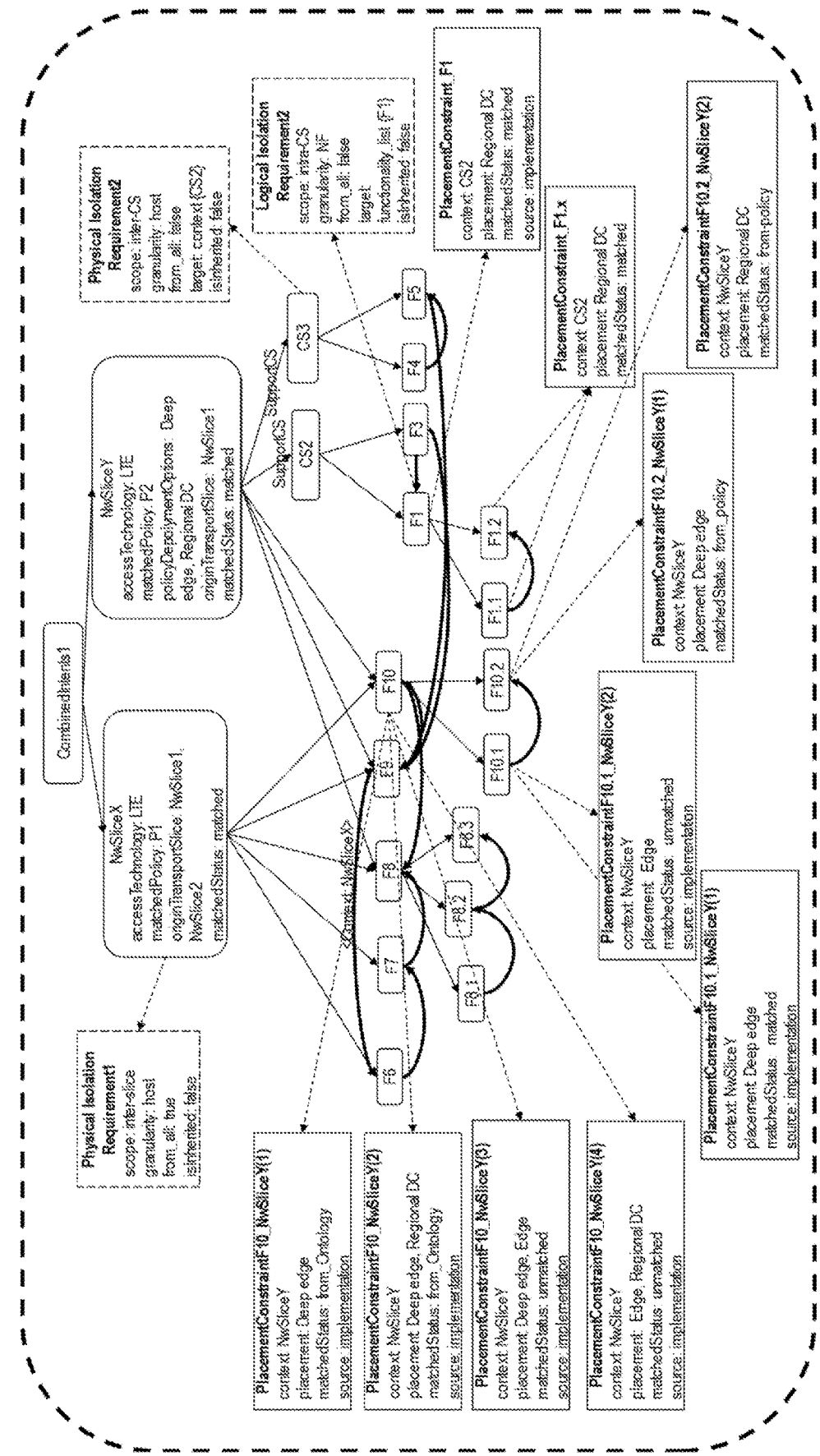
FIG. 11 is a schematic illustration of an example of a partial SM model after setting the placement constraints by the bottom-up processing in the context of NwSliceY.

Both placements constraints match the allowed placements, therefore, their matchedStatus is set to "from_Ontology" and their source attribute is set to "implementation". FIG. 11 shows the placement constraints resulting in the context of NwSliceY.

NwSliceX does not have any policyDeploymentOptions, and no placement constraints are specified for its composing functionalities. Thus, no top-down placement constraints propagation is performed.

The process continues with the processing of placement constraints of leaf functionalities whose corresponding functionalities in the NSliceOntology have no allowed placements (i.e. F6, F7, F9, F10.1 and F10.2) defined or that are defined by available implementations (i.e. source attribute is "implementation").

Since NwSliceX does not have any policyDeploymentOptions, functionalities F6, F7, F9, F10.2 will have their placement constraints attribute set with all possible placement values defined by the SM metamodel. The matchedStatus of these placement constraints attributes are set to "all_values".

Functionality F10.1 does not have placement constraints in the SM model, and its corresponding functionality in the NSliceOntology has its allowed placements set to "Deep edge, Edge". In this case, two placement constraints attributes are defined for F10.1 one with the value of "Deep edge" and the second one with the value of "Edge". Both attributes have their context set to NwSliceX, their matchedStatus set to "from_Ontology" and their source set to "implementation".

Figure 12:
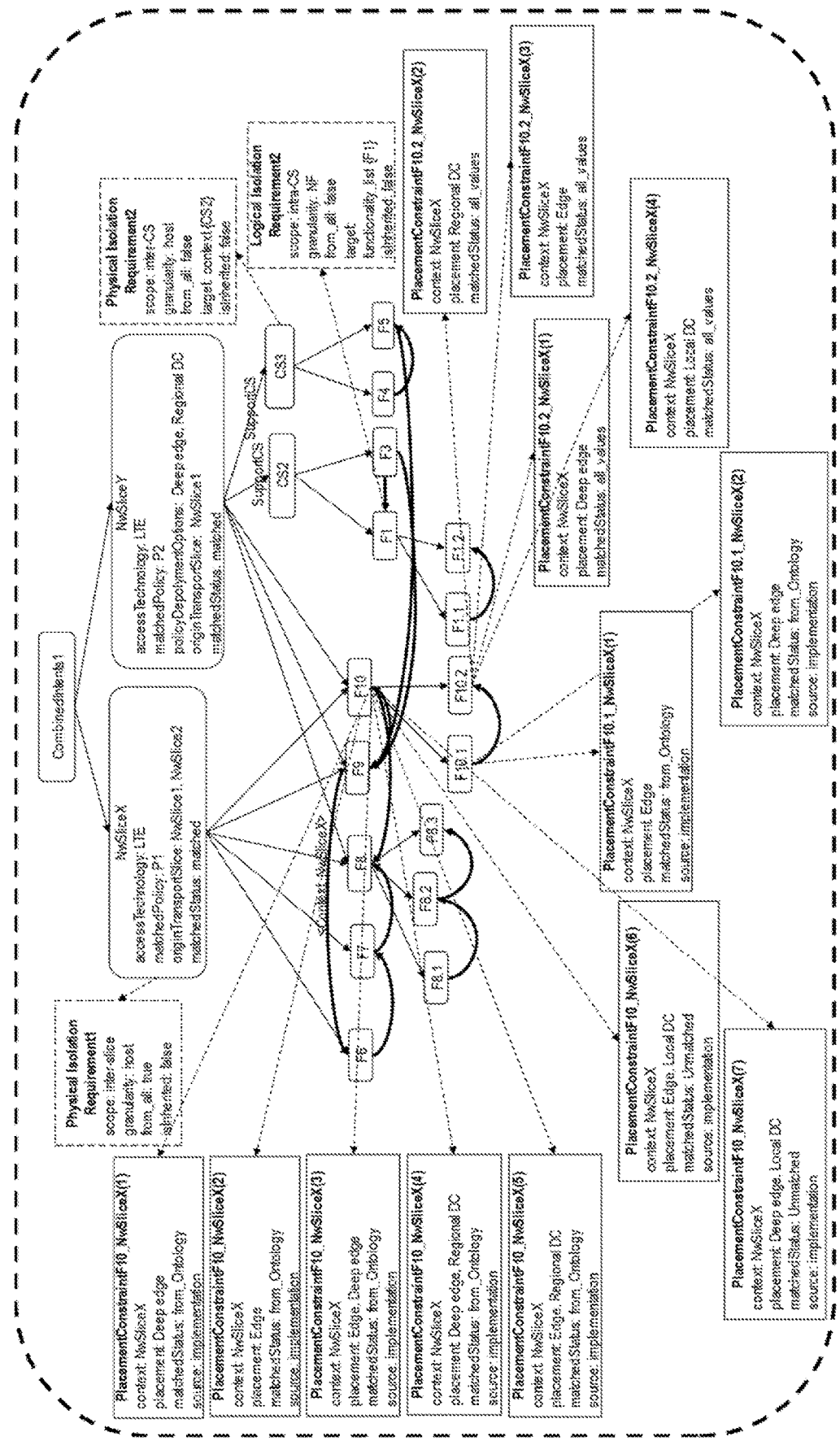
FIG. 12 is a schematic illustration of an example of partial SM model with placement constraints in the context of NwSliceX set by the bottom-up processing.

The processing continues with functionality F10. Functionality F10 in the SM does not have any placement constraints while its corresponding functionality in the NSliceOntology has its allowed placements set to "Edge, Deep edge, Regional DC". In this case, for F10 a placement constraints attribute is created for each possible combination of the placement values of its child functionalities F10.1 and F10.2. These are then matched to the allowed placements of F10. A subset of the matching result is shown in FIG. 12.

Updating the placement constraints in the SM model. In this step, the placement constraints are updated for the child functionalities that have their placement matchedStatus set to "from_Ontology", "from_policy", or "all_values".

For the example, the placement constraints are updated for the child functionalities of F10.

In the context of NwSliceY, there is no need to update the placements of F10.1 and F10.2 as they do not include any additional placement values compared to their parent F10.

Figure 13:
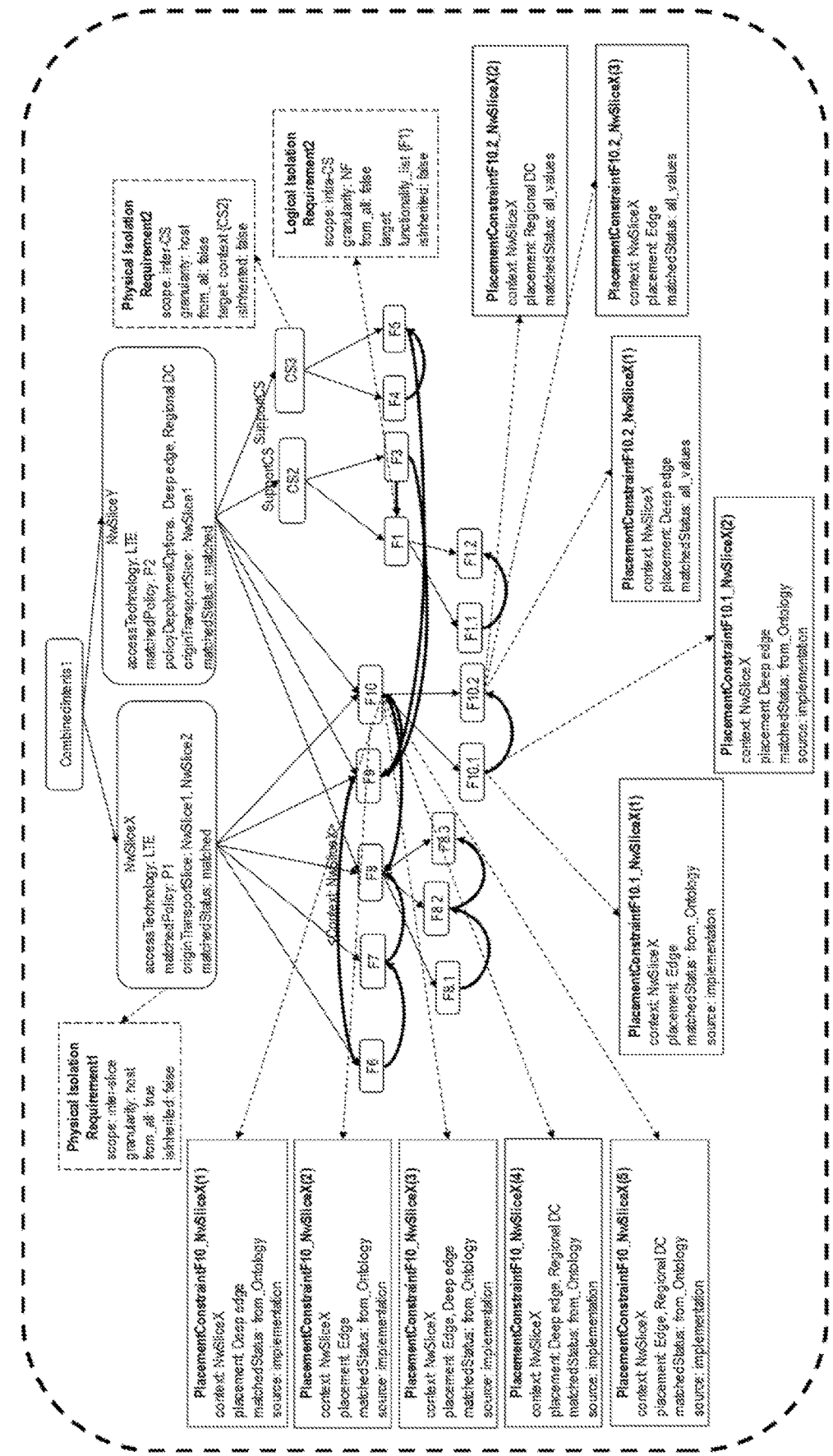
FIG. 13 is a schematic illustration of an example SM model with the updated placement constraints in the context of NwSliceX.

In the context of NwSliceX, from the placement constraints of F10.2 the value of "Local DC" is removed, since this value is not specified among the placement constraints of F10. FIG. 13 shows the updated placement constraints for F10.2 in the context of NwSliceX.

Figure 14:
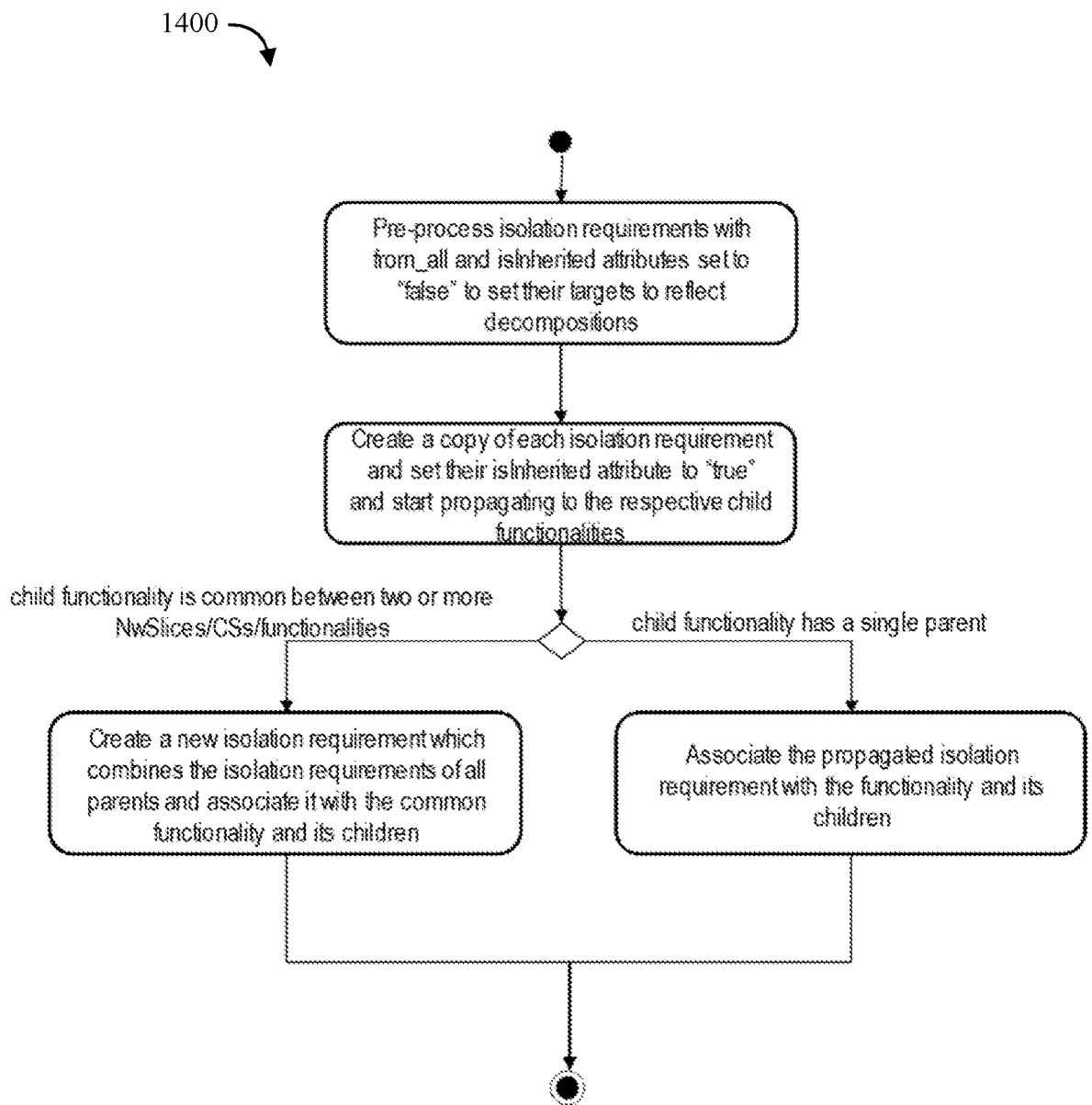
FIG. 14 is a flowchart of a method for isolation requirements propagation.

Reference is now made to FIG. 14 which describes a method 1400 for propagating the isolation requirements.

The isolation requirements copied from the CombinedIntents model to the SM model represent the user intent to isolate the requested NwSlices, CSs and/or their functionalities. This is indicated by their isInherited attribute set to "false". These are high-level isolation requirements, which need to be applied to the lower-level functionalities that were the result of the functional decomposition.

In this propagation, logical and physical isolation requirements are handled in the same way according to the method illustrated in FIG. 14.

First, the isolation requirements of those NwSlices, CSs and functionalities that have their from_all and isInherited attributes both set to "false" are pre-processed to reflect the relevant functional decompositions of the SM model in their target attribute. The target attribute of an isolation requirement may specify the context, the list of functionalities from which to be isolated and their plane. To set these sub-attributes of the target attribute, the scope of the isolation requirement is checked.

In the scopes "intra-slice" and "intra-CS", the isolation requirements are applicable among the constituents of the NwSlice or the CS respectively. Therefore, the context specified in the target attribute remains unchanged. The functionality_list sub-attribute is complemented to include the functional decomposition of the functionalities of the original functionality_list. If the plane sub-attribute is specified, then only the functionalities of that plane are included in the functionality_list.

If the isolation requirement is defined with the scope of "inter-slice" or "inter-CS", the context of the target attribute is evaluated. If a context is specified (NwSlice(s) or CS(s)), all the child functionalities of the specified context are added to the functionality_list sub-attribute. If the functionality_list attribute references functionalities, then the child functionalities of these referenced functionalities are also added to the functionality_list attribute as applicable for the context if specified (i.e. the decomposition of the same functionality may be different for different contexts or for no specific context). In either case, if a plane is specified then the functionalities to be added to the functionality_list attribute are filtered by the specified plane, i.e. only those functionalities of the specified plane are added.

After pre-processing, all the isolation requirements are propagated to the respective child functionalities. To do so, a new isolation requirement element is created from the propagated one for which the isInherited attribute is set to "true". Then this isolation requirement is associated with the respective child functionalities.

If a plane is specified in the source attribute, the isolation requirement will be associated only to the functionalities of that plane.

In case two or more of the NwSlices, CSs and/or functionalities have a common functionality, a copy of the isolation requirement is created for this common functionality and its children with the context of the source attribute set to the union of the contexts of all parents.

Figure 15:
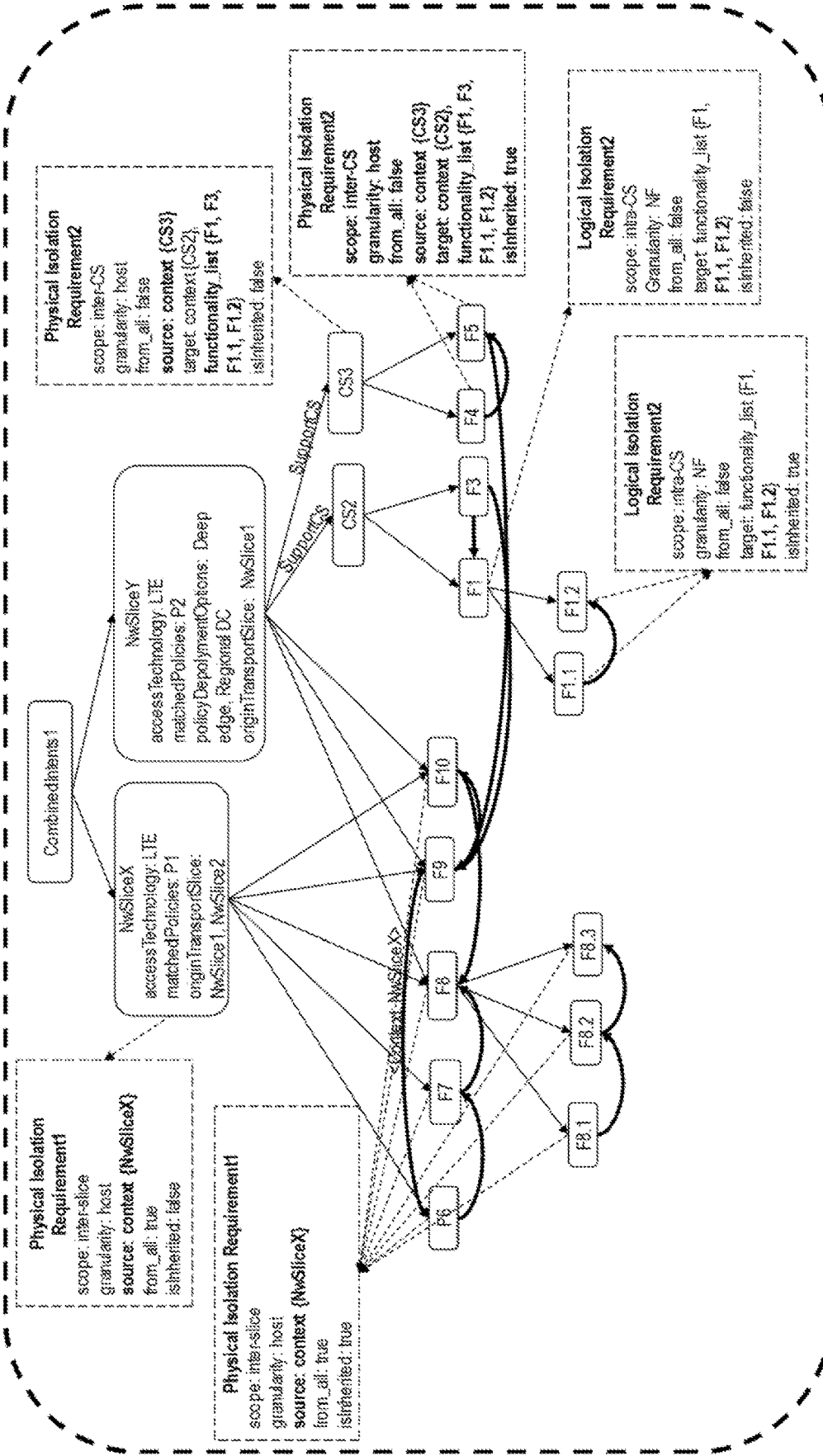
FIG. 15 is a schematic illustration of an example SM model after the propagation of the isolation requirements.

To illustrate the isolation requirement propagation on an example, the SM model generated in the previous step (FIG. 13) is used. FIG. 15 shows the partial SM model after the completion of the propagation.

In the CombinedIntents model, a physical isolation requirement was requested for CS3, namely Physical Isolation Requirement2. Its from_all and isInherited attributes are set to "false" and it specifies in its target context "CS2". Therefore, in the functionality_list of the target attribute the functionalities composing CS2 also need to be added, namely F1, F3, F1.1 and F1.2. Then, the context of the source attribute is set to CS3. A corresponding isolation requirement is created with the isInherited attribute set to "true" and it is associated with the child functionalities of CS3 (F4 and F5).

NwSliceX has a physical isolation requirement with the from_all attribute set to true. In this case, the context of the source is set to NwSliceX and this isolation requirement is associated with all the composing functionality of NwSliceX.

Functionality F1 has a logical isolation requirement that references Functionality F1 in its target attribute. Therefore, the functionality_list of the target attribute is enriched with the functionalities composing F1, namely F1.1 and F1.2. Then, the isolation requirement is associated to those Functionalities.

The overall approach is summarized below.

Decompose the NwS/CS into child functionalities using the ontology.
Propagate the placement constraints requested by the user or required by the operator policy to the child functionalities;
  the placement constraints requested by the user and required by the operator policy behave the same way, but a user requested constraint has priority, i.e. constraint of an operator policy cannot override it, the operator policy is applied only if there is no user requirement;
  therefore, the placement constraints of the user intent are propagated first, then, for those functionalities that do not have placement constraints from the user intent, the operator policies are checked and propagated. The placement constraints from the user and from the operator policy can be refer to as requested placement constraint.
Process the propagated requested placement constraints against the ontology;
Top-down to check against standard based allowed placements;
  If there is a standard placement, check with the requested placement and determine whether there is a match or not;
  If there is a standard placement but there is no requested placement, then apply the standard placement and propagate it to the child functionalities;
Bottom-up to check against implementation based allowed placements;
  For the leaf functionalities first;
    If there is a requested placement, check it against the implementation placement and determine if they match or not, if there is no implementation placement then the requested placement is matched (since the implementation is not limited to any particular placement);
    If there is no requested placement but there are implementation placements, then apply the implementation placements in the ontology and set them as matched (i.e. from ontology);
    If there is no placement constraint on either side, then create placement constraints for all allowed values and set these placement constraints as matched (i.e. for all values);
  Traverse the parents of processed child functionalities (starting with the leaves);

If the parent has no constraint, combine the constraints from the child functionalities applicable for the parent's context (a child may belong to many parents and this may result in different aggregations for the different parents) check the resulting constraints against the ontology and set the matching status;

If the parent has a constraint on its own, check it against the ontology and set the matching status, if ontology does not have a constraint the matching is set based on the matching of the child functionalities;

Update the placement constraints of child functionalities based on the constraints of the parents, i.e. remove any placement added from the ontology or due to no ontology restriction which would extend the placement constraint of the parent.

Propagate the isolation constraints.

In summary, if the SM (i.e. requested constraint) and the ontology specify constraints the method compares them and sets the matching status accordingly; if the SM does not have constraint then the method applies the constraints of corresponding functionalities from the ontology and these constraints are considered matched; if neither the SM nor the ontology has constraints then all possibilities are allowed and constraints are created for all allowed values with the status matched provided the parent context allows these values, i.e. values not permitted by the parent context are not created or removed. Parents without constraints aggregate the implementation constraints of their child functionalities. Child functionalities inherit their parents requested and standard placement constraint.

Figure 16:
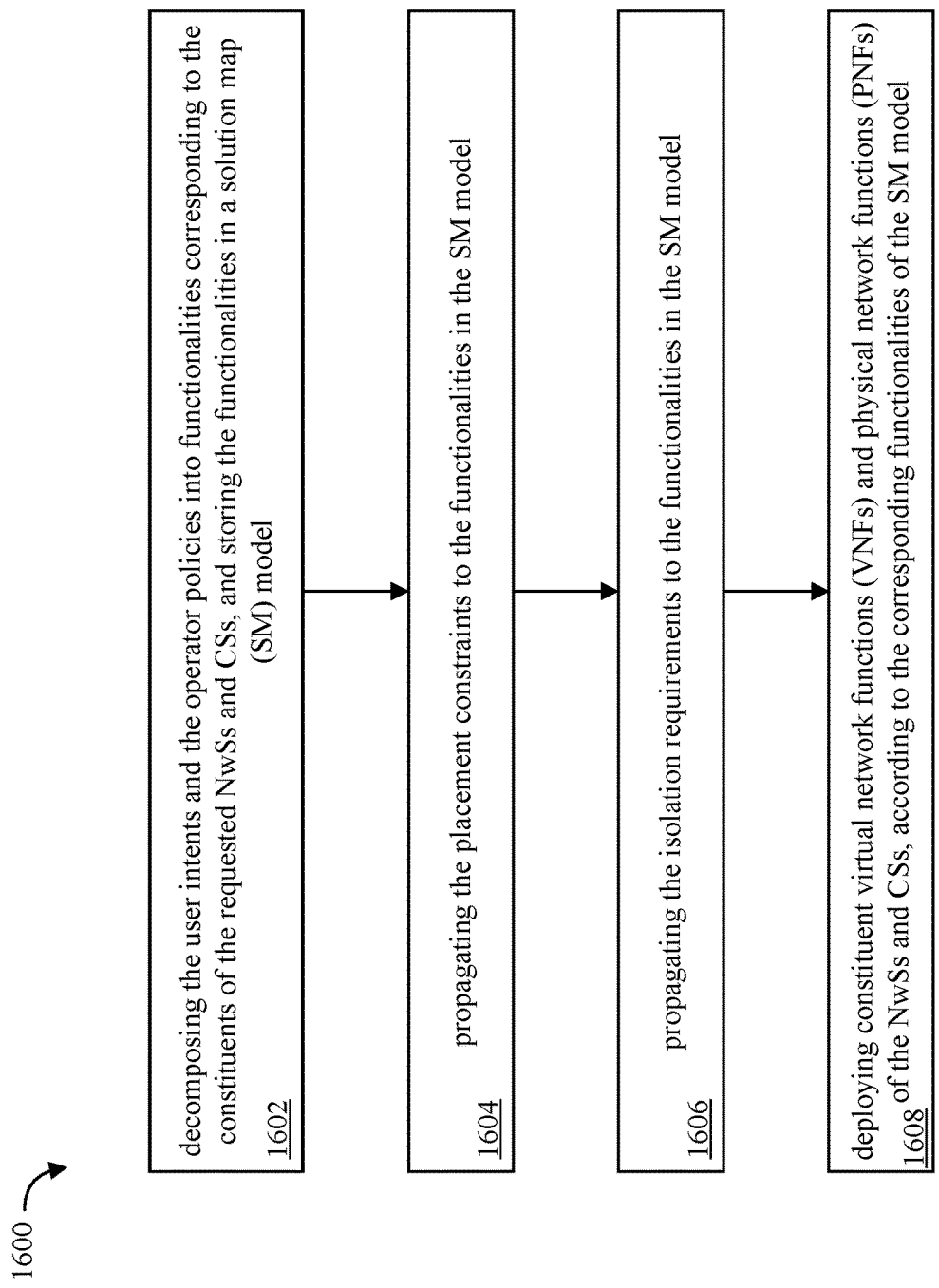
FIG. 16 is a flowchart of a method for propagating placement constraints and isolation requirements, from user intents and operator policies to constituents of user requested network slices (NwSs) and communication services (CSs).

FIG. 16 illustrates a method 1600 for propagating placement constraints and isolation requirements, from user intents and operator policies to constituents of user requested network slices (NwSs) and communication services (CSs). The method comprises decomposing, step 1602, the user intents and the operator policies into functionalities corresponding to the constituents of the requested NwSs and CSs, and storing the functionalities in a solution map (SM) model. The method comprises propagating, step 1604, the placement constraints to the functionalities in the SM model. The method comprises propagating, step 1606, the isolation requirements to the functionalities in the SM model. The method comprises deploying, step 1608, constituent virtual network functions (VNFs) and physical network functions (PNFs) of the NwSs and CSs, according to the corresponding functionalities of the SM model.

Decomposing the user intents and the operator policies into functionalities may be done by searching and finding the functionalities corresponding to the requested NwSs and CSs and determining constituents of the NwSs and CSs in an ontology.

Each NwS/CS can be represented as a tree, with the functionality corresponding to the NwS/CS and the tree showing the composing functionalities. Initially, in the SM there may be only a root functionality (NwS/CS). This root may be matched to the ontology, where the rest of the tree is described, and the rest of the tree may be brought to the SM. In such a case, the VNFs/PNFs may become the leaves of the tree, i.e. these are the deployable constituents.

The user intents and operator policies may include the placement constraints and isolation requirements, and the ontology may be a knowledge base containing placement and isolation constraints of available implementations of functionalities or specified by standards for NwS and CS and constituents of the NwSs and CSs.

Decomposing may further comprise selecting architectural blocks realizing the functionalities, in the ontology, and adding the architectural blocks to the SM model.

Propagating placement constraints may comprise propagating placement constraints of a functionality to child functionalities in the SM model and setting them as unmatched. First, all placement constraints may be propagated from the user intent/operator policy and set as unmatched. Then as the placement constraints are compared with the ontology, they are set as matched if they are aligned with the ontology information.

After propagating placement constraints to child functionalities, the placement constraints of the functionalities may be compared with allowed placement values for corresponding functionality in the ontology and the placement constraints of the functionalities are updated according to the allowed placement values.

For example, if there is a placement constraint in the SM and in the ontology as well, then this update is the result of their comparison, i.e. matched or unmatched. If there is no placement constraint in the SM and there is in the ontology then this update copies the values from the ontology to the SM and also sets the matching status to "from ontology" which is similar to the status matched.

A top down approach may be used for setting placement constraints of functionalities of the SM model having no placement constraints to standard placement constraints available in the ontology.

For example, this is the case where there is nothing in the SM to compare to, but the ontology has standard placement which is applied. The intents should not be overridden. If intents are specified then it is check if they are the same as in the standard, if yes they are matched otherwise, they are unmatched. This can be achieved first propagating the placement constraints of the intents and then do the matching with the ontology. Or if the matching is performed before the propagation, then the propagation removes any value added from the ontology which does not match the intents.

A bottom up approach may be used for setting placement constraints of functionalities of the SM model having no or unmatched standard placement constraints to implementation placement constraints available in the ontology.

For example, the bottom up approach may comprise setting the implementation placement constraints for the leaf functionalities, i.e. to be able to deploy a leaf functionality, it should have an implementation which might have constraints. These are the constraints that are collected and checked. Again, the user intent or operator policy are not overridden; they are checked if they are aligned with the constraints in the ontology for the available implementations. Accordingly, if they are aligned they are set to matched, if not they are unmatched. If there is no user/operator constraint, then the available implementations dictate and set the constraint from the ontology. If there are no restriction anywhere then all values are allowed and placement constraint are set for each of them.

The method may further comprise aggregating implementation placement constraints of child functionalities and propagating the aggregated implementation placement constraints of child functionalities to parent functionalities having no placement constraints.

For example, the bottom up approach may comprise aggregating the implementation placement constraints of child functionalities for each parent that does not have its own placement constraints. The parent's constraint is compared with the corresponding functionality in the ontology and if there is a constraint and they are aligned, the status is set as matched otherwise it is set as unmatched. If the ontology does not have a constraint then a status matching the status from the child functionalities is set, and if any of the status is unmatched then it is set to unmatched.

The top down approach and the bottom up approach may be applied to each NwS and CS of the SM model, and the top down approach may apply placement constraints according to standard NwSs and CSs decompositions, and the bottom up approach may apply placement constraints according to available implementation.

Propagating the isolation requirements may comprise propagating isolation requirements of a functionality to child functionalities in the SM model.

The method may further comprise, when a child functionality is common to more than one functionalities, creating a new isolation requirement combining the isolation requirements of all parent functionalities of the child functionality, and associating the new isolation requirement with the child functionality that is common to more than one functionalities.

Figure 17:
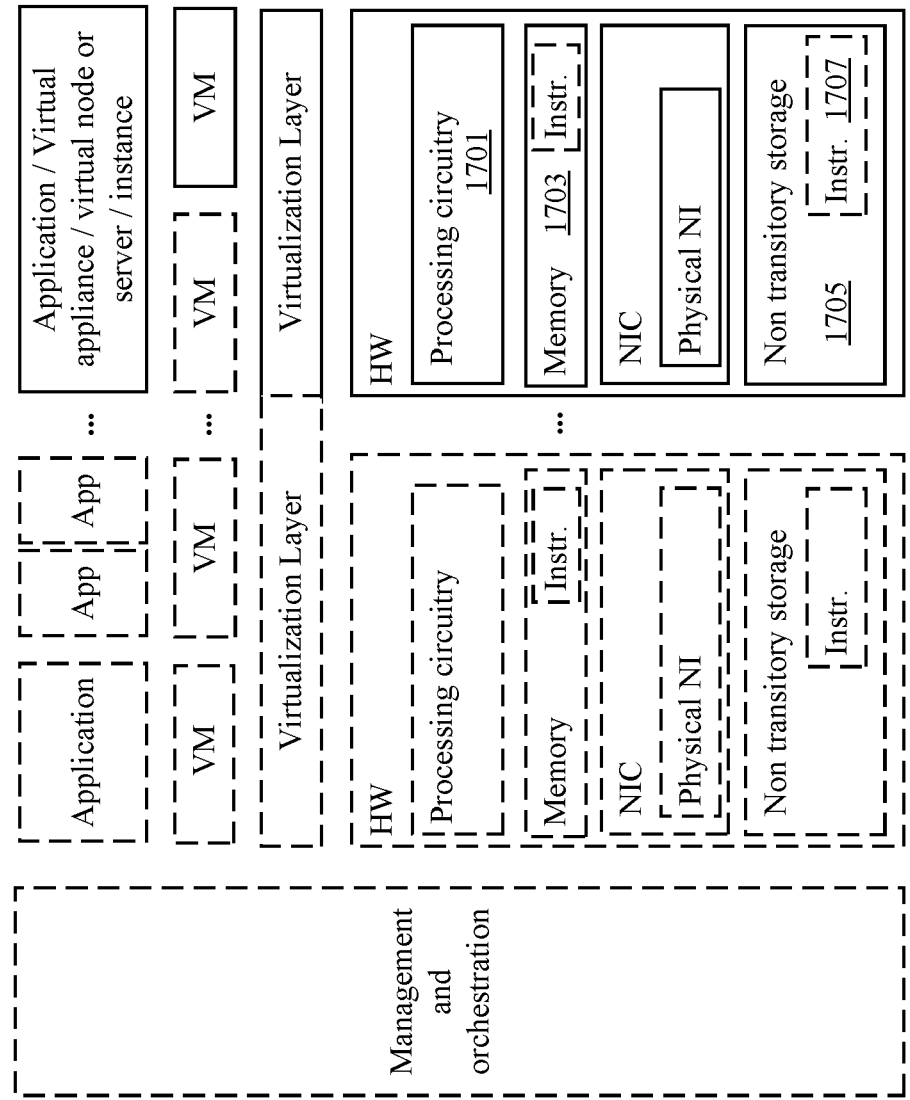
FIG. 17 is a schematic illustration of a virtualization environment in which the different method(s) and apparatus(es) described herein can be deployed.

Referring to FIG. 17, there is provided a virtualization environment in which functions and steps described herein can be implemented.

A virtualization environment (which may go beyond what is illustrated in FIG. 17), may comprise systems, networks, servers, nodes, apparatus, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 1701 and memory 1703. The memory can contain instructions executable by the processing circuitry whereby functions and steps described herein may be executed to provide any of the relevant features and benefits disclosed herein.

The hardware may also include non-transitory, persistent, machine readable storage media 1705 having stored therein software and/or instruction 1707 executable by processing circuitry to execute functions and steps described herein.

The virtualization environment of FIG. 17 comprises an apparatus (such as HW, not numbered) or system, for propagating placement constraints and isolation requirements, from user intents and operator policies to constituents of user requested network slices (NwSs) and communication services (CSs). The apparatus or system comprises processing circuits 1701 and a memory 1703, the memory containing instructions executable by the processing circuits whereby the apparatus or system is operative to execute the following steps. Decompose the user intents and the operator policies into functionalities corresponding to the constituents of the requested NwSs and CSs, and store the functionalities in a solution map (SM) model. Propagate the placement constraints to the functionalities in the SM model. Propagate the isolation requirements to the functionalities in the SM model. Deploy constituent virtual network functions (VNFs) and physical network functions (PNFs) of the NwSs and CSs, according to the corresponding functionalities of the SM model.

The apparatus or system may be further operative to decompose the user intents and the operator policies into functionalities by searching and finding the functionalities corresponding to the requested NwSs and CSs and determining constituents of the NwSs and CSs in an ontology.

The user intents and operator policies may include the placement constraints and isolation requirements, and the ontology may be a knowledge base containing placement and isolation constraints of available implementations of functionalities or specified by standards for NwS and CS and constituents of the NwSs and CSs.

The apparatus or system may be further operative to select architectural blocks realizing the functionalities, in the ontology, and add the architectural blocks to the SM model.

The apparatus or system may be further operative to propagate placement constraints of a functionality to child functionalities in the SM model and setting them as unmatched.

After propagating placement constraints to child functionalities, the placement constraints of the functionalities may be compared with allowed placement values for corresponding functionality in the ontology and the placement constraints of the functionalities may be updated according to the allowed placement values.

A top down approach may be used for setting placement constraints of functionalities of the SM model having no placement constraints to standard placement constraints available in the ontology.

A bottom up approach may be used for setting placement constraints of functionalities of the SM model having no or unmatched standard placement constraints to implementation placement constraints available in the ontology.

The apparatus or system may be further operative to aggregate implementation placement constraints of child functionalities and propagate the aggregated implementation placement constraints of child functionalities to parent functionalities having no placement constraints.

The top down approach and the bottom up approach may be applied to each NwS and CS of the SM model, the top down approach may apply placement constraints according to standard NwSs and CSs decompositions, and the bottom up approach may apply placement constraints according to available implementation.

The apparatus or system may be further operative to propagate isolation requirements of a functionality to child functionalities in the SM model.

The apparatus or system may be further operative to, when a child functionality is common to more than one functionalities, create a new isolation requirement combining the isolation requirements of all parent functionalities of the child functionality, and associate the new isolation requirement with the child functionality that is common to more than one functionalities.

The virtualization environment of FIG. 17 also comprises a non-transitory computer readable media 1705 having stored thereon instructions 1707 for propagating placement constraints and isolation requirements, from user intents and operator policies to constituents of user requested network slices (NwSs) and communication services (CSs). The instructions comprise decomposing the user intents and the operator policies into functionalities corresponding to the constituents of the requested NwSs and CSs, and storing the functionalities in a solution map (SM) model. The instructions comprise propagating the placement constraints to the functionalities in the SM model. The instructions comprise propagating the isolation requirements to the functionalities in the SM model. The instructions comprise deploying constituent virtual network functions (VNFs) and physical network functions (PNFs) of the NwSs and CSs, according to the corresponding functionalities of the SM model.

The non-transitory computer readable media may further comprise instructions for executing any of the steps or functions described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. Although specific terms may be employed herein, they are used in a generic and descriptive sense only and not for purposes of limitation.

The invention claimed is:

1. A method for propagating placement constraints and isolation requirements, from user intents and operator policies to constituents of user requested network slices (NwSs) and communication services (CSs), comprising:
    decomposing the user intents and the operator policies into functionalities corresponding to the constituents of the requested NwSs and CSs, and storing the functionalities in a solution map (SM) model;
    propagating the placement constraints to the functionalities in the SM model;
    propagating the isolation requirements to the functionalities in the SM model; and
    deploying constituent virtual network functions (VNFs) and physical network functions (PNFs) of the NwSs and CSs, according to the corresponding functionalities of the SM model.

2. The method of claim 1, wherein decomposing the user intents and the operator policies into functionalities is done by searching and finding the functionalities corresponding to the requested NwSs and CSs and determining constituents of the NwSs and CSs in an ontology.

3. The method of claim 2, wherein user intents and operator policies include the placement constraints and isolation requirements, and wherein the ontology is a knowledge base containing placement and isolation constraints of available implementations of functionalities or specified by standards for NwS and CS and constituents of the NwSs and CSs.

4. The method of claim 2, wherein decomposing further comprises selecting architectural blocks realizing the functionalities, in the ontology, and adding the architectural blocks to the SM model.

5. The method of claim 3, wherein propagating placement constraints comprises propagating placement constraints of a functionality to child functionalities in the SM model and setting the placement constraints as unmatched.

6. The method of claim 5, wherein after propagating placement constraints to child functionalities, the placement constraints of the functionalities are compared with allowed placement values for corresponding functionality in the ontology and the placement constraints of the functionalities are updated according to the allowed placement values.

7. The method of claim 5, wherein a top down approach is used for setting placement constraints of functionalities of the SM model having no placement constraints to standard placement constraints available in the ontology.

8. The method of claim 7, wherein a bottom up approach is used for setting placement constraints of functionalities of the SM model having no or unmatched standard placement constraints to implementation placement constraints available in the ontology.

9. The method of claim 8, further comprising aggregating implementation placement constraints of child functionalities and propagating the aggregated implementation placement constraints of child functionalities to parent functionalities having no placement constraints.

10. The method of claim 8, wherein the top down approach and the bottom up approach are applied to each NwS and CS of the SM model, wherein the top down approach applies placement constraints according to standard NwSs and CSs decompositions, and wherein the bottom up approach applies placement constraints according to the available implementations.

11. The method of claim 1, wherein propagating the isolation requirements comprises propagating isolation requirements of a functionality to child functionalities in the SM model.

12. The method of claim 11, further comprising, when a child functionality is common to more than one functionalities, creating a new isolation requirement combining the isolation requirements of all parent functionalities of the child functionality, and associating the new isolation requirement with the child functionality that is common to more than one functionalities.

13. An apparatus, for propagating placement constraints and isolation requirements, from user intents and operator policies to constituents of user requested network slices (NwSs) and communication services (CSs), comprising processing circuits and a memory, the memory containing instructions executable by the processing circuits whereby the apparatus is operative to:
    decompose the user intents and the operator policies into functionalities corresponding to the constituents of the requested NwSs and CSs, and store the functionalities in a solution map (SM) model;
    propagate the placement constraints to the functionalities in the SM model;
    propagate the isolation requirements to the functionalities in the SM model; and
    deploy constituent virtual network functions (VNFs) and physical network functions (PNFs) of the NwSs and CSs, according to the corresponding functionalities of the SM model.

14. The apparatus of claim 13, further operative to decompose the user intents and the operator policies into functionalities by searching and finding the functionalities corresponding to the requested NwSs and CSs and determining constituents of the NwSs and CSs in an ontology.

15. The apparatus of claim 14, wherein user intents and operator policies include the placement constraints and isolation requirements, and wherein the ontology is a knowledge base containing placement and isolation constraints of available implementations of functionalities or specified by standards for NwS and CS and constituents of the NwSs and CSs.

16. The apparatus of claim 14, further operative to select architectural blocks realizing the functionalities, in the ontology, and add the architectural blocks to the SM model.

17. The apparatus of claim 15, further operative to propagate placement constraints of a functionality to child functionalities in the SM model and setting the placement constraints as unmatched.

18. The apparatus of claim 17, wherein after propagating placement constraints to child functionalities, the placement constraints of the functionalities are compared with allowed placement values for corresponding functionality in the ontology and the placement constraints of the functionalities are updated according to the allowed placement values.

19. The apparatus of claim 17, wherein a top down approach is used for setting placement constraints of functionalities of the SM model having no placement constraints to standard placement constraints available in the ontology.

20. The apparatus of claim 19, wherein a bottom up approach is used for setting placement constraints of functionalities of the SM model having no or unmatched standard placement constraints to implementation placement constraints available in the ontology.

21. The apparatus of claim 20, further operative to aggregate implementation placement constraints of child functionalities and propagate the aggregated implementation placement constraints of child functionalities to parent functionalities having no placement constraints.

22. The apparatus of claim 20, wherein the top down approach and the bottom up approach are applied to each NwS and CS of the SM model, wherein the top down approach applies placement constraints according to standard NwSs and CSs decompositions, and wherein the bottom up approach applies placement constraints according to the available implementations.

23. The apparatus of claim 13, further operative to propagate isolation requirements of a functionality to child functionalities in the SM model.

24. The apparatus of claim 23, further operative to, when a child functionality is common to more than one functionalities, create a new isolation requirement combining the isolation requirements of all parent functionalities of the child functionality, and associate the new isolation requirement with the child functionality that is common to more than one functionalities.

25. A non-transitory computer readable media having stored thereon instructions for propagating placement constraints and isolation requirements, from user intents and operator policies to constituents of user requested network slices (NwSs) and communication services (CSs), the instructions comprising:
   decomposing the user intents and the operator policies into functionalities corresponding to the constituents of the requested NwSs and CSs, and storing the functionalities in a solution map (SM) model;
   propagating the placement constraints to the functionalities in the SM model;
   propagating the isolation requirements to the functionalities in the SM model; and
   deploying constituent virtual network functions (VNFs) and physical network functions (PNFs) of the NwSs and CSs, according to the corresponding functionalities of the SM model.

* * * * *